US009302247B2

(12) United States Patent
Begag et al.

(10) Patent No.: US 9,302,247 B2
(45) Date of Patent: Apr. 5, 2016

(54) AEROGEL SORBENTS

(71) Applicant: Aspen Aerogels, Inc., Northborough, MA (US)

(72) Inventors: Redouane Begag, Hudson, MA (US); Wendell E Rhine, Belmont, MA (US); Wenting Dong, Marlborough, MA (US)

(73) Assignee: ASPEN AEROGELS, INC., Northborough, MA (US)

(*) Notice: Subject to any disclaimer, the term of this patent is extended or adjusted under 35 U.S.C. 154(b) by 298 days.

(21) Appl. No.: 13/871,763

(22) Filed: Apr. 26, 2013

(65) Prior Publication Data

US 2013/0287661 A1    Oct. 31, 2013

Related U.S. Application Data

(60) Provisional application No. 61/639,893, filed on Apr. 28, 2012.

(51) Int. Cl.
| | |
|---|---|
| *B01J 20/26* | (2006.01) |
| *B01J 20/30* | (2006.01) |
| *B01D 53/62* | (2006.01) |
| *B01J 20/22* | (2006.01) |
| *B01D 53/02* | (2006.01) |
| *B01J 20/28* | (2006.01) |
| *B01J 20/10* | (2006.01) |
| *B01J 20/32* | (2006.01) |

(52) U.S. Cl.
CPC ............ *B01J 20/3085* (2013.01); *B01D 53/02* (2013.01); *B01D 53/62* (2013.01); *B01J 20/103* (2013.01); *B01J 20/22* (2013.01); *B01J 20/28011* (2013.01); *B01J 20/28047* (2013.01); *B01J 20/28059* (2013.01); *B01J 20/28061* (2013.01); *B01J 20/28071* (2013.01); *B01J 20/28073* (2013.01); *B01J 20/28076* (2013.01); *B01J 20/28083* (2013.01); *B01J 20/3248* (2013.01); *B01J 20/3272* (2013.01); *B01D 2253/20* (2013.01); *B01D 2253/25* (2013.01); *B01D 2257/504* (2013.01); *Y02C 10/04* (2013.01); *Y02C 10/08* (2013.01)

(58) Field of Classification Search
CPC ............ B01J 20/3085; B01J 20/28083; B01J 20/28047; B01J 20/103; B01J 20/28061; B01J 20/28076; B01J 20/28073; B01J 20/22; B01D 53/02; B01D 53/62; B01D 2257/504; B01D 2253/25; B01D 2253/20; Y02C 10/04; Y02C 10/08
USPC ................... 423/228; 556/424, 413; 502/402
See application file for complete search history.

(56) References Cited

U.S. PATENT DOCUMENTS

| | | |
|---|---|---|
| 3,491,031 A | 1/1970 | Stoneburner |
| 4,264,377 A | 4/1981 | Schafer |
| 4,305,827 A | 12/1981 | Sasaki |
| 4,668,255 A | 5/1987 | Govind |
| 4,810,266 A | 3/1989 | Zinnen et al. |
| 4,873,218 A | 10/1989 | Pekala |
| 5,086,085 A | 2/1992 | Pekala |
| 5,087,597 A | 2/1992 | Leal et al. |
| 5,270,027 A | 12/1993 | Balducci et al. |
| 5,376,614 A | 12/1994 | Birbara et al. |
| 5,462,908 A | 10/1995 | Liang et al. |
| 5,492,683 A | 2/1996 | Birbara et al. |
| 5,538,931 A | 7/1996 | Heinrichs et al. |
| 5,830,387 A | 11/1998 | Yokogawa et al. |
| 5,876,488 A | 3/1999 | Birbara et al. |
| 5,928,806 A | 7/1999 | Olah et al. |
| 6,127,306 A | 10/2000 | Husing et al. |
| 6,197,270 B1 | 3/2001 | Sonada et al. |
| 6,307,116 B1 | 10/2001 | Heinrichs et al. |
| 6,364,938 B1 | 4/2002 | Birbara et al. |
| 6,402,813 B2 | 6/2002 | Monereau et al. |
| 6,547,854 B1 | 4/2003 | Gray et al. |
| 6,908,497 B1 | 6/2005 | Sirwardane |
| 7,288,136 B1 | 10/2007 | Gray et al. |
| 7,767,004 B2 | 8/2010 | Sayari et al. |
| 7,795,175 B2 | 9/2010 | Olah et al. |
| 8,067,478 B1 * | 11/2011 | Meador et al. ............. 521/154 |
| 2006/0165574 A1 | 7/2006 | Sayari |
| 2007/0149398 A1 | 6/2007 | Jones et al. |
| 2008/0293976 A1 | 11/2008 | Olah et al. |
| 2011/0005390 A1 | 1/2011 | Haugan |
| 2011/0179948 A1 | 7/2011 | Choi et al. |
| 2011/0240907 A1 | 10/2011 | Sharma et al. |

OTHER PUBLICATIONS

Sheng et al. "Mesoporous amine-modified SiO2 aerogel: a potential CO2 sorbent" May 5, 2011, Energy Environ. Sci., 2011,4, 2070-2074.*
Xiaochun et al. "Novel Polyethylenimine-Modified Mesoporous Molecular Sieve of MCM-41 Type as High-Capacity Adsorbent for CO2 Capture" Oct. 12, 2002, Energy Fuels, 2002, 16 (6), pp. 1463-1469.*
S.S. Kistler, E.A. Fischer and I.R. Freeman, J. Am. Chem. Soc., 1943, 65(10),1909.
U. Schubert, F. Schwertfeger, N. Husing and E. Seyfried, Mat. Res. Soc. Symp. Proc. vol. 346. p. 151, 1994.
A. Santos, J.A. Toledo-Fernandez, R. Mendoza-Serna, L. Gago-Duport, N D. Rosa-Fox, M, Pinero and L. Esquivias, Ind. Eng. Chem. Res. 2007, 46, 103.
W. Cao and A. Hunt, Mat. Res. Soc. Symp. Proc. vol. 346. p. 631, 1994.
N. Husing and U. Schubert, Che, Mater. 1998, 10, 3024.
U. Schubert, N. Husing and A. Lorez, Chem. Mater. 1995, 7, 2010.

* cited by examiner

*Primary Examiner* — Colleen Dunn
*Assistant Examiner* — Haytham Soliman
(74) *Attorney, Agent, or Firm* — Mark Hanson; Poongunran Muthukumaran

(57) ABSTRACT

The current invention describes methods and compositions of various sorbents based on aerogels of various silanes and their use as sorbent for carbon dioxide. Methods further provide for optimizing the compositions to increase the stability of the sorbents for prolonged use as carbon dioxide capture matrices.

22 Claims, 14 Drawing Sheets

Figure 4. Nitrogen sorption-desorption isotherms of mono-amine/MTES aerogels (ammonia addition).

Figure 5. Pore size distribution of mono-amine/MTES aerogels(no ammonia addition).

Figure 6. Pore size distribution of mono-amine/MTES aerogels (Ammonia added).

Figure 7. XPS spectra of MTES aerogel (blank sample) and two amine functionalized aerogels.

Figure 8. Schematic of sorbent screening test unit.

Figure 9. AFA performance evaluated.

Figure 10. Working capacity of sample CQ is about 3% at 1,827 kJ/kg $CO_2$ capture.

Figure 11. $CO_2$ Sorption capacity at $P_{CO2} = 0.15$ versus temperature.

Figure 12. Working capacity for sample GE.

AEROGEL SORBENTS

CROSS-REFERENCE TO RELATED APPLICATIONS

This application claims the benefit from U.S. Provisional Patent Application 61/639,893 filed on Apr. 28, 2012, which is hereby incorporated by reference in its entirety as if sully set forth.

GOVERNMENT INTEREST

This invention was made with the United States Government support under the Contract no. DE-SC0004289 from the U.S. Department of Energy. The Government has certain rights in the invention.

DESCRIPTION OF THE INVENTION

Climate change and global warming is currently considered one of the most pressing and severe environmental problems. One of the main causes for global warming is believed to be the increasing concentration of carbon dioxide in the atmosphere due to the combustion of fossil fuels such as coal, petroleum and natural gas. Fossil fuels supply about 85% of the world's energy needs since fossil fuels are still relatively inexpensive and easy to use, and no satisfactory alternatives are available to replace them on the enormous scale needed. The increasing use of fossil fuels releases huge amounts of carbon dioxide in the atmosphere every year, and there is increased pressure to limit these releases due to its perceived impact on global climate change.

Most of the emissions of $CO_2$ to the atmosphere come from the electricity generation power plants and the industrial sector and are bi-products from combustion of fossil fuels. The $CO_2$ concentration in flue gas is typically 4-14% by volume, although $CO_2$ is produced at higher concentrations by a few industrial processes. In principle, flue gas could be stored, to avoid emissions of $CO_2$ to the atmosphere, but it would have to be compressed to a pressure of typically more than 10 MPa which would consume an excessive amount of energy. Also, the high volume of flue gas would mean that storage reservoirs would be filled quickly.

The primary approach for limiting the release of $CO_2$ into the atmosphere is to capture it as it's released for possible storage via one of several potential sequestration technologies. A relatively high purity $CO_2$ source is preferred for transport and sequestration, but a key roadblock to $CO_2$ sequestration is the development of cost-effective $CO_2$ capture/separation technologies. The most likely options for $CO_2$ separation and capture include chemical absorption, physical and chemical adsorption, low-temperature distillation, gas-separation membranes, mineralization/biomineralization, and vegetation. Viable $CO_2$ capture and sequestration technologies would permit the world to continue using fossil fuels but with much reduced emissions of $CO_2$, and allow time for low-$CO_2$ emission energy sources to be developed and introduced on a large scale.

The most widely used technology for the capture of $CO_2$ is the "wet-scrubbing" amine-solution based sorption process. Carbon dioxide scrubbing is currently used on a large scale for the purification of industrial gases (natural gas, syngas, etc.). These processes use mainly alkanolamine aqueous solutions (G. Astarita, D. W. Savage and A. Bisio, *Gas Treating with Chemical Solvents*, John Wiley, NY, 1983), the most common being mono- and di-ethanolamines, (MEA and DEA) and N-methyldiethanolamine (MDEA). The process is reversible and can be represented as follows:

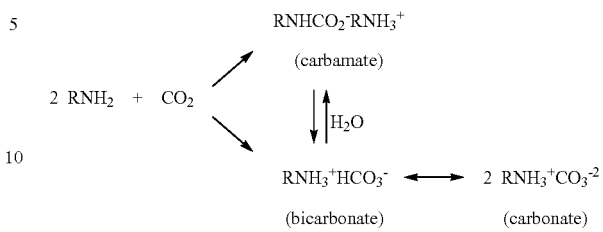

Wet chemical stripping of $CO_2$ involves one or more reversible chemical reactions between $CO_2$ and another substance such as MEA to produce a carbonate. Upon heating, the carbonate decomposes to free $CO_2$ and the original amine is regenerated which becomes available to react with additional $CO_2$. An example of the process using monoethanol amine is:

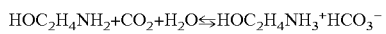

Typically, MEA and DEA are used as 25 to 30 wt. % amine in aqueous solution. The amine solution enters the top of an absorption tower while the carbon dioxide containing gaseous stream is introduced at the bottom. During contact with the $CO_2$-containing gaseous stream, the amine solution chemically absorbs the carbon dioxide from the gaseous stream. Desorption of the adsorbed carbon dioxide proceeds through a thermal regeneration process. Carbon dioxide and water emerge from the amine solution and the water is separated by condensing the water vapor in a heat exchanger. After regeneration the amine solution is recycled back to the absorption tower for additional carbon dioxide absorption. However, this process has several disadvantages, such as high energy consumption, solvent regeneration, the corrosion of the equipment and toxicity. Further, the amine solution has a limited lifetime due to degradation through oxidation of the amine.

A promising alternative technology to the liquid-phase sorption is to use solid sorbents for capturing $CO_2$ by means of the pressure or temperature swing adsorption system, offering possible energy savings and stable performance. There are different classifications of sorbents; chemical sorbents that react with the $CO_2$ and physical sorbents that adsorb the $CO_2$. Amines and other chemicals, such as sodium carbonate, can be immobilized on the surface of solid supports to create a sorbent that reacts with the $CO_2$. Solid sorbents that physically adsorb $CO_2$ include carbon based materials, carbon nanotubes and zeolites (natural and synthetic). Potential advantages of solid sorbents are as follows: Ease of material handling (coal plants are experienced with solids handling), Safe for local environment, High $CO_2$ capacity, Lower regeneration energy and Multi-pollutant control.

Chemical sorbents that react with the $CO_2$ in the flue gas include a support, usually high surface area, with an immobilized amine or other reactant on the surface. The surface area allows for numerous reaction sites. Examples of commonly used supports are alumina or silica, while common reactants include amines such as polyethylenimine' or chemicals such as sodium carbonate.

SUMMARY OF THE INVENTION

The current invention discloses porous carbon dioxide sorbents comprising an aerogel of products of co-gelation of at least a hydrolyzed alkylalkoxysilane and a hydrolyzed aminosilane. The aerogels of the sorbent comprises at least an open pore accessible to carbon dioxide. Preferably, the open pore is interconnected with one or more of other pores. The aerogels involved in the current invention have a silica network created by the sol-gel reaction of a hydrolyzed alkylalkoxysilane and a hydrolyzed aminosilane. Tertraalkoxysilanes or a hydrolyzed form thereof may also be included in the sol-gel reaction to produce complex structures with unique properties relevant to the resulting materials used as sorbents. When tetroalkoxysilanes are used, he percentage of tetraalkoxysilane sin the total silanes may vary from 5% to about 90%.

The amino groups present in the sorbents are such that carbon dioxide can reasonably access the groups and participate in the sorption. The aerogels of the current invention may be inherently hydrophobic due to the alkyl groups in the silica matrix or optionally silylated after the silica matrix is formed by treating the gel matrix with a silylating agent such as hexamethyldisilazane, hexamethuldisiloxane or others as described in this document or known in the art. The sol-gel reaction or co-gelation may also include dialkyldialkoxysilane.

The alkylalkoxysilane may contain one, two or three alkyl groups. The alkyl groups in the several silanes described herein contains between 1 and 6 carbon atoms. The alkyl groups may be methyl, ethyl, propyl, n-butyl, t-butyl or other higher carbon alkyl groups. The various silanes used in the different embodiments of the current invention may also have additional functional groups. The alkylalkoxysilanes described here may be selected from the group consisting of methyltrimethoxysilane, methyltriethoxysilane, ethyltrimethoxysilane, ethyltriethoxysilane, propyltrimethoxysilane, propyltriethoxysilane, dimethyldimethoxysilane, dimethyldiethoxysilane, diethyldiethoxysilane, diethyldimethoxysilane, trimethylmethoxysilane, trimethylethoxysilane, triethylmethoxysilane, triethylethoxysilane, tripropylmethoxysilane, tripropylethoxysilane, (3,3,3-Trifluoropropyl)trimethoxysilane, (3,3,3-Trifluoropropyl)triethoxysilane and a combination thereof. The dialkyldialkoxysilanes described herein may be selected from the group consisting of dimethyldimethoxysilane, dimethyldiethoxysilane, diethyldiethoxysilane, or diethyldimethoxysilane or mixtures thereof. The aminosilanes may be a mono, di, tri or poly amine-containing silanes. The aminosilanes may also be aminoalkoxysilanes selected from the group consisting of 3-aminopropyl-triethoxysilane (APTES), 3-aminopropyl-trimethoxysilane (APTMS), N-(2-aminoethyl)-3-aminopropyltriethoxysilane (AE-APTES), N-(2-aminoethyl)-3-aminopropyltrimethoxysilane (AE-APTMS), p-aminophenyltrimethoxysilane, N-3-([amino(polypropylenoxy])-amino-propyl-trimethoxy-silane (aminoether), (3-trimethoxylsilylpropyl)diethylenetriamine (TMS-DETA), trimethoxy-silane modified polyethyleneimine and a combination thereof.

In an embodiment, the amino groups are located for the most part on or close proximity to the aerogel surfaces or pore surfaces. Sorbents of the current invention may be contacted with a gaseous stream comprising at least some carbon dioxide and on such exposure capture at least some carbon dioxide from such stream in the sorbent. The sorbents of the current invention may be regenerated by heating, purging with another gas, by exposing to a reduced pressure or other means known in the art for regenerating sorbent systems. The sorbents may be designed to be stable for at least 250 capture-regeneration cycles, preferably, for at least 500 capture-regeneration cycles, more preferably, for at least 1000 capture-regeneration cycles, or further more preferably, for at least 2000 capture-regeneration cycles. The stability refers to the sorbent's ability to retain its original chemical composition substantially at least by 60%. The sorbents also retain the capture rate of carbon dioxide for extended capture-regeneration cycles. The sorbents may also be exposed to high temperatures. In some cases, the degradation in the capture rate of carbon dioxide of up to 80% of the original value or up to 90% of the original value may be tolerated. The moisture content of the sorbents of various embodiments may be controlled to be less than 10% by weight and preferably less than 2% by weight. The co-gelation reactants may comprise aminosilanes from 5% to 70% by weight.

The aerogel sorbents of the current invention have densities between 0.01 and 0.6 g/cc and preferably between 0.03 and 0.34 g/cc. The sorbents of various embodiments of the current invention have the carbon dioxide capture rate between 0.08 g and 0.4 g of carbon dioxide per gram of the aerogel in the sorbent. In some embodiments, the capture rate of the sorbents degrades no more than 80% while exposed to temperatures up to 130° C. and capture-regeneration cycles of at least 500.

The process of preparing the carbon dioxide capture sorbent involves the steps of co-gelling at least a hydrolyzed alkylalkoxysilane with a hydrolyzed aminosilane. Various compatible solvents are useful in the co-gelation step including alcohols containing between 1 and 6 carbon atoms. In a preferred embodiment, ethanol is used as the solvent. Water is various ratios may also be involved to accomplish the sol-gel reactions. Water may also be a product of some of these reactions. The ratios and solvents are adjusted so that precipitation or phase separation is avoided. Tertraalkoxysilanes or a hydrolyzed form thereof may also be included in the sol-gel reaction to produce complex structures with unique properties relevant to the resulting materials used as sorbents. When tetroalkoxysilanes are used, he percentage of tetraalkoxysilane sin the total silanes may vary from 5% to about 90%.

The resultant gel is dried to obtain an aerogel. The drying may be performed in various ways, including supercritical drying, using supercritical carbon dioxide, ambient or slightly elevated pressure drying, subcritical drying, freeze drying or various combinations thereof. The wet gels or the dried aerogels may be treated with silylating agents such as hexamethyldisilazane or hexamethyldisiloxane. In a preferred embodiment, a wet gel is treated with the silylating agent and dried through the various methods described above. Optionally, tetra-alkoxysilane is included in the co-gelation. In yet another embodiment, dialkyldialkoxysilane in various amounts is added to the co-gelation. The alkyl groups of various silanes used in these processes contain between 1 and 6 carbon atoms. The silanes may also have additional functional groups. The alkylalkoxysilanes used in the various processes may contain mono, di or tri alkly groups and may be selected from the group consisting of methyltrimethoxysilane, methyltriethoxysilane, ethyltrimethoxysilane, ethyltriethoxysilane, propyltrimethoxysilane, propyltriethoxysilane, dimethyldimethoxysilane, dimethyldiethoxysilane, diethyldiethoxysilane, diethyldimethoxysilane, trimethylmethoxysilane, trimethylethoxysilane, triethylmethoxysilane, triethylethoxysilane, tripropylmethoxysilane, tripropylethoxysilane, (3,3,3-Trifluoropropyl)trimethoxysilane, (3,3,3-Trifluoropropyl)triethoxysilane and a combination thereof. The aminosilans may be mono, di, tri or poly amine-containing silanes. The aminosilanes may also contain alkoxy groups such that they are amonoalkoxysilanes.

The aminosilane may be selected from the group consisting of 3-aminopropylmethyldiethoxysilane, 3-aminopropyltriethoxysilane (APTES), 3-aminopropyl-trimethoxysilane (APTMS), N-(2-aminoethyl)-3-aminopropyltriethoxysilane (AE-APTES), N-(2-aminoethyl)-3-aminopropyl-trimethoxysilane (AE-APTMS), p-aminophenyltrimethoxysilane, N-3-([amino(poly-propyleneoxy])-amino-propyl-trimethoxy-silane (aminoether), (3-trimethoxylsilylpropyl)-diethylenetriamine (TMS-DETA), trimethoxy-silane modified polyethyleneimine and a combination thereof. The aminogroups are preferably located on the surfaces of the resulting aerogels.

The various sorbents described herein may be used to capture carbon dioxide either in a gaseous stream or present in a defined space. The sorbents may be ground into powders with particles sizes in the range of 1 microns to 10 mm. The ground aerogels may be used in sorbing carbon dioxide. Such ground aerogels may be present in columns where a gaseous stream containing carbon dioxide is flown through. After the sorbents have sufficiently captured the carbon dioxide, they may be heated, purged with another gas or subjected to a reduced pressure to remove the carbon dioxide. The capture and removal of carbon dioxide may be performed at different locations resulting in the segregation or sequestration of carbon dioxide. The removal or carbon dioxide from the sorbents by heating, purging with another gas or subjecting o a reduced pressure is also referred to as regeneration.

The process of capturing the carbon dioxide and regenerating the sorbent such that it is ready for use as sorbent again is referred to as capture-regeneration cycle. The sorbents produced in the various processes described here may be stable for at least 250 capture-regeneration cycles, preferably for at least 500 capture-regeneration cycles and more preferably, for at least 1000 capture-regeneration cycles and still more preferably for at least 2000 capture-regeneration cycles. The co-gelation reactants of various processes described here may have aminosilanes from 5% to 70% by weight.

A process of capturing carbon dioxide comprising the following steps is described. A carbon dioxide sorbent described in the various embodiments of the current invention are provided in monolithic, composite or powder form. At least part of a gas or gaseous stream is contacted with the sorbent. The resulting sorbent is heated, purged with another gas or subjected to reduced pressure to remove the carbon dioxide. The removed carbon dioxide is collected and transported or stored as appropriate. In another embodiment, a process is described where a gel is formed from the gelation of alkyltrialkoxysilane or co-gelation of alkyltrialkoxysilane and tetraalkoxysilane and the resulting gel is exposed to an amine and subsequently dried. The sorbent obtained in such a process is used to capture carbon dioxide as described above. The amines used for amine treatment of the gel as described above is selected from tetraethylenepentamine (TEPA), polyethyleneimine (PEI) or combinations thereof.

An object of the current invention is to produce amine functionalized hydrophobic silica aerogels for $CO_2$ sorption and use thereof. In accordance with one embodiment, the present invention provides a moisture stable $CO_2$ adsorbent where loss of the amine and $CO_2$ adsorption capacity can largely or completely be prevented. One embodiment ensures moisture stability by bonding the amine into the backbone of an intrinsically hydrophobic methyltriethoxysilane (MTES) aerogel and it's $CO_2$ adsorption capacity can exceed 10 wt % $CO_2$ at 40° C.

In accordance with one aspect of the present invention there is provided an aerogel support having an open interconnected pore structure that allows facile access of gases to the pore surfaces. The silica aerogel has a relatively broad pore size distribution compared to periodic silica supports previously disclosed and can have pores as large as 100 nm. The aerogels of the current invention have a pore volume of between 0.2 and 1.6 cc/g, average pore diameter of between 3 and 40 nm, and a BET surface area of between 20 and 500 $m^2/g$.

In accordance with another embodiment of the present invention, there is provided an inherently hydrophobic, regenerable sorbent for use in a $CO_2$ capture process, where said sorbent is comprised of an amine-functionalized silica aerogel, wherein amino groups are covalently bonded to the surface or network structure and are readily accessible within the interconnected pores or pore walls of the silica aerogel.

In accordance with another embodiment of the present invention there is provided a method for removing or recovering carbon dioxide from an gaseous stream or atmosphere containing carbon dioxide, comprising the step of contacting the gaseous stream or atmosphere with an adsorbent comprising a functionalized aerogel support having a pore volume of between 0.2 and 1.6 cc/g, a median pore diameter of between 4 and 40 nm, and a BET surface area of between 20 and 500 $m^2/g$, which support is functionalized by addition of $CO_2$ reactive functional groups within the pores and external surface of said support material.

In accordance with another embodiment of the present invention there is provided a process for manufacturing an adsorbent, comprising: (a) providing a functionalized aerogel support having a pore volume of between 0.2 and 1.6 cc/g, a median pore diameter of between 4 and 40 nm, and a BET surface area of between 20 and 500 $m^2/g$; and (b) grafting a functionalization compound, which contains one or more $CO_2$ reactive groups, to the surface of the pores of said support material; or (c) directly loading a functionalization compound, which contains one or more $CO_2$ reactive groups, into the pores of said support material.

DETAILED DESCRIPTION OF THE INVENTION

Figure 1:
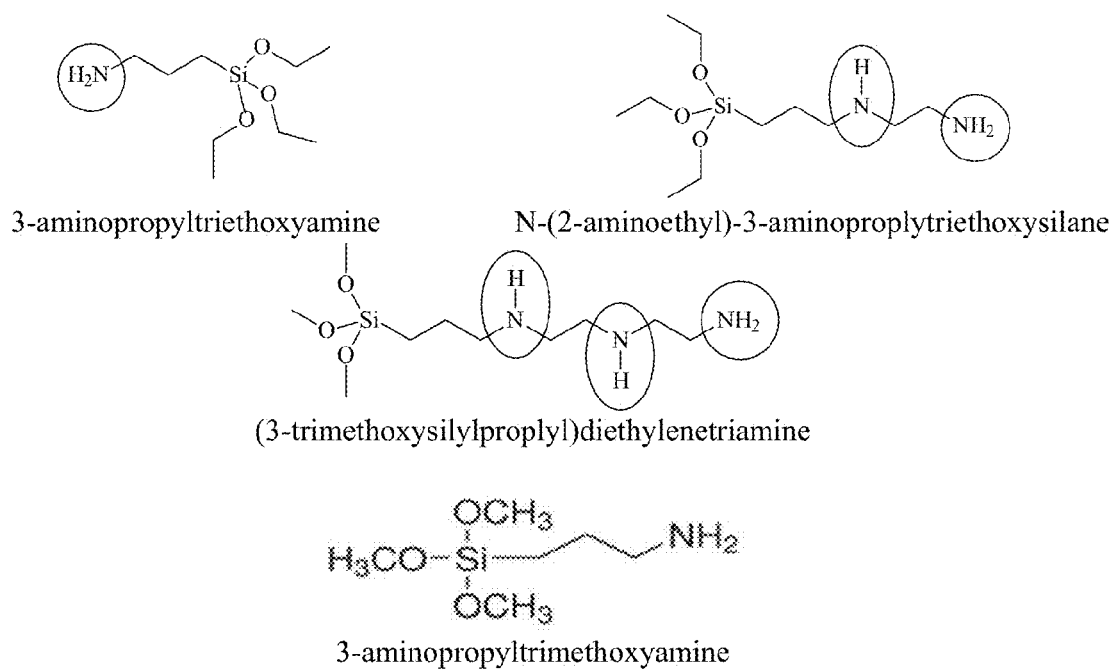
FIG. 1 illustrates structure of some of the amine alkoxysilane precursors used in sol gel synthesis of this program.

The present invention relates to efficient removal of carbon dioxide, for example, from dry or humid process streams, or atmospheres, by selective sorption using a sorbent comprising an amine functionalized silica aerogel support material. In a specific embodiment, the support material is characterized by a total pore volume of between 0.2 to 1.6 cc/g, a median pore diameter of 4 to 40 nm, and a total BET surface area of between 20 and 500 m$^2$/g. The pore diameter of the support material of the present invention is larger than in previously known typical periodic mesoporous silica support materials (e.g. KIT-n, MCM-41, SBA-n and MCM-48) and is characterized by having an interconnected open porosity instead of non-interconnected channels.

The sorbent of the present invention is prepared using various methods, including those outlined herein, in order to obtain material having varying capacities and rates of sorption. In each case the sorbent comprises a hydrophobic silica aerogel that contains amine functional groups that remain accessible to the sorbate.

The current patent application makes use of an inherently hydrophobic aerogel which also contains amines bonded to the surface of the pore walls and/or within the silica matrix. Compared to periodic silica supports and fumed silica they are unique materials and are characterized by their high surface areas and interconnected open pores which allows facile access of gases to all pores throughout the porous structure.

Aerogels are highly porous low-density materials, prepared by forming a gel and subsequently eliminating the liquid with preservation of the gel structure. In a narrow sense, an aerogel is understood to refer to a material in which the liquid has been removed from the gel under supercritical conditions or using a supercritical fluid, whereas, when the gel is dried under subcritical conditions, the resulting product is called a xerogel, and when the liquid is eliminated from the frozen state by sublimation, the product is called a cryogel. Aerogels in a broad sense are understood to have any porous gel structure where solvents are replaced with air or another gas or combination of gases. In the broad sense aerogels include the aerogels, xerogels and cryogels in the narrow sense. The word "supercritically dried" as used herein refers to the processes where the gels are dried at or above the supercritical condition of the solvent involved or dried using a supercritical fluid like supercritical carbon dioxide. While the conditions might be supercritical for the solvent, for example, $CO_2$, it need not be above the critical point of the mixture, say a mixture of alcohol and $CO_2$.

Because of their high porosity, aerogels have interesting physical properties which make them suitable for use, among other things, as heat insulating materials, acoustic materials, luminescent solar collectors, gas filters, catalysts or support materials.

In general, the aerogels used are those based on metal oxides suitable for the sol-gel technology (see e.g., C. J. Brinker and G. W. Scherer, Sol-Gel Science, 1990, Chapters 2 and 3), such as Si, Al, Ti, Sn or Zr compounds, or those based on organic substances suitable for the sol-gel technology, such as melamine-formaldehyde condensates (U.S. Pat. No. 5,086,085) or resorcinol-formaldehyde condensates (U.S. Pat. No. 4,873,218). However, they can also be based on mixtures of the aforementioned materials. Used by preference are aerogels containing Si or Al compounds, particularly Si compounds; $SiO_2$ aerogels are particularly preferred. Aerogels can be prepared from mixtures of pure metal alcoholates, particularly of Si, Al, Zr, Ti and Sn alcoholates or mixtures thereof. Here, the term "metal alcoholate" includes the corresponding semimetal and in this invention the gel is preferably prepared from mixtures of tetraalkoxysilanes [Si(OR)$_4$, wherein R represents $C_1$-$C_6$-alkyl moiety, preferably methyl or ethyl, and trialkoxysilanes [(RO)$_3$Si—R', where R' represents $C_1$-$C_6$-alkyl moiety (preferably methyl), and R has the meaning indicated above]. Such alkoxysilanes (methoxy, ethoxy, propoxy, butoxysilane, etc) are commercially available. However there continues to be a demand for additional organofunctionalized aerogels for specific applications.

Silica gels are synthesized by the hydrolysis and condensation of silicon containing precursors (in most cases an alkoxide). The sol can be cast on fiber reinforcements to make flexible aerogel blankets, or as monoliths in molds, or as particles or beads. Gelation can be tuned to occur in seconds, minutes or hours, depending on the type and amount of catalyst used. The initial gels prepared are strengthened by an aging process at moderate temperatures during which hydrophobicity imparting agents can be added. Typical hydrophobicity imparting agents are hexamethyldisilazane (HMDZ) and hexamethylsiloxane (HMDS). Aerogels are obtained when the gels are dried in a manner that does not significantly alter the structure of the wet gel. Supercritical processes (using $CO_2$) are used as they eliminate capillary forces that cause the gel structure to collapse. In the current process, the gels are made in alcohol solvents and dried using supercritical carbon dioxide.

The method for making hydrophobic aerogels of the current invention involves first making a gel. Subsequently, this preformed gel is soaked in a bath containing a mixture of solvent and the desired hydrophobizing agent in a process often referred to as surface derivatization. For example, U.S. Pat. No. 5,830,387 (Yokogawa et al.) describes a process whereby a gel having the skeleton structure of $(SiO_2)_n$ was obtained by hydrolyzing and condensing an alkoxysilane. This gel was subsequently hydrophobized by soaking it in a solution of a hydrophobizing agent dissolved in solvent. Similarly, U.S. Pat. No. 6,197,270 (Sonada et al.) describes a process of preparing a gel having the skeleton structure of $(SiO_2)_m$ from a water glass solution, and subsequently reacting the gel with a hydrophobizing agent in a dispersion medium (e.g., a solvent or a supercritical fluid).

U.S. Patent Application 2011/0240907 describes methods where the metal oxide precursor comprises an organosilane, e.g., a tetraalkoxysilane such as tetraethoxysilane (TEOS) and tetramethoxysilane (TMOS) or a pre-polymerized silicon alkoxide such as ethyl polysilicate. In some embodiments, the organosilane comprises an alkyl-substituted alkoxysilane, such as methyltrimethoxysilane (MTMOS) or HMDZ. Generally, during the gel formation process, the hydrophobic surface modifying agent combines with the skeletal structure formed by the metal oxide precursor to provide a hydrophobic surface. In some embodiments, the hydrophobic surface modifying agent is covalently bonded, ionically bonded, or physically adsorbed to the metal oxide skeleton. Generally, the hydrophobic surface modifying agent comprises two functional elements. The first element reacts with (e.g., covalently or ionically) or absorbs on to the metal oxide skeleton. The second element is a hydrophobic surface modifying agents such as organosilane, organosiloxane, organotin, and organo-phosphorus compounds.

Silica aerogels, due to their large surface area and high porosity, make effective sorbents; however, the rigid pore structure is very susceptible to collapsing if it is penetrated with a heavy liquid. Aerogels are imparted with chemical treatments to make them hydrophobic, thus avoiding pore collapse from liquid water.

Methyltriethoxysilane (MTES) aerogels modified with an amine precursor shows strong potential for high $CO_2$ adsorption capacity and long durability, even in high steam content flue gas. MTES aerogel is produced by mixing MTES in ethanol solution. The amount of water used to hydrolyze the silica precursor has been shown to have a huge impact on physical properties (pore structure, surface area, density, shrinkage). The polycondensation reaction (gelation) is completed by adding ammonia as base catalyst. The gelation time is long and ranges between 5 and 24 hours depending on EtOH/MTES and ammonia/MTES ratios.

Unlike amine grafted zeolites or other supported amine sorbents actually under investigation for carbon capture application, MTES aerogels are intrinsically hydrophobic (water contact angle >150°). This property is vital for performance durability and multiple-cycle use of a solid sorbent in $CO_2$ capture. Even small amounts of moisture can negatively impact the $CO_2$ capture performance over time. In general, post combustion flue gas contains: 12% $CO_2$, 74% $N_2$, 12% $H_2O$, 4% $O_2$. Because of this water content, hydrophobic sorbent material is strongly recommended for $CO_2$ capture.

The advantage of amine functionalized hydrophobic silica aerogels in comparison with mere impregnation of an amine onto the aerogel matrix, is that loss of amine can be largely or completely prevented. In order to ensure suitability of hydrophobic methyltriethoxysilane (MTES) aerogel for $CO_2$ capture application, the amine must be bonded into the silica aerogel backbone (MTES leads to intrinsically hydrophobic aerogels without additional hydrophobe treatment). The route for producing this type of hybrid silica aerogel is to co-gel MTES silica with an amine functionalized silica precursor. MTES and three different aminoalkoxysilane precursors (mono-, di-, and tri-amine) were used in the preparation of amine functionalized aerogel (AFAs). The aminosilanes such as 3-aminopropylmethyldiethoxysilane, 3-aminopropyl-triethoxysilane (APTES), 3-aminopropyl-trimethoxysilane (APTMS), N-(2-aminoethyl)-3-aminopropyltriethoxysilane (AE-APTES), N-(2-aminoethyl)-3-aminopropyltrimethoxysilane (AE-APTMS), p-aminophenyl-trimethoxysilane, N-3-([amino(polypropylenoxy])-amino-propyl-trimethoxy-silane (aminoether), (3-trimethoxylsilylpropyl)diethylenetriamine (TMS-DETA), and trimethoxy-silane modified polyethyleneimine are commercially available. The following amine-containing trialkoxysilane precursors may also be used: Aminopropyl-triethoxysilane (mono-amine) (APTES), Aminopropyltrimethoxysilane (mono-amine) (APTMS), N-(2-aminoethyl)-3aminopropyltriethoxysilane (di-amine) (AE-APTES), (3-trimethoxysilylpropyl)diethylenetriamine (tri-amine) (TMS-DETA)

The chemical structures of the candidate precursor materials are shown in FIG. 1.

Figure 2:
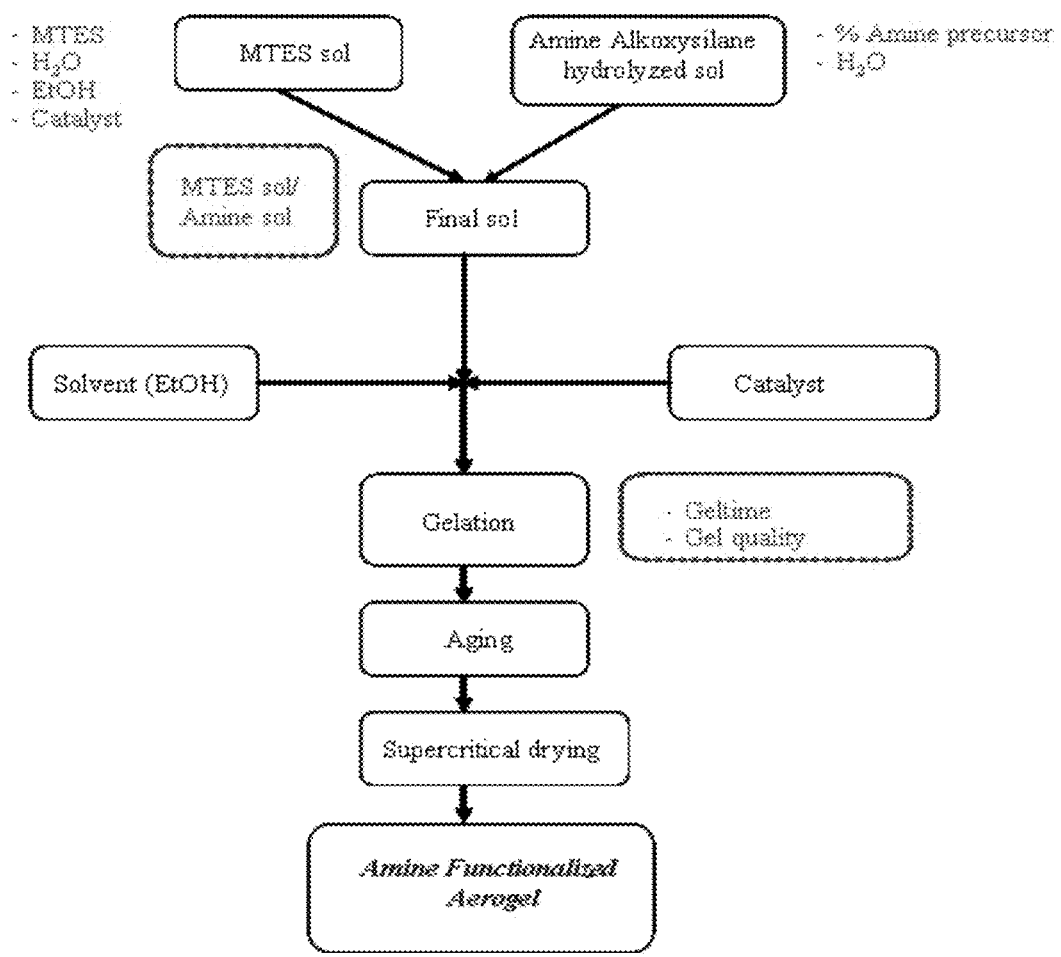
FIG. 2 illustrates a synthesis route to prepare Amine Functionalized Aerogels for $CO_2$ capture.

FIG. 2 shows the synthetic route of the sol-gel preparation of Amine Functionalized Aerogels (AFAs).

The gel quality is determined by the hydrolysis degree of the amine precursor, water content in the co-gel formulation, ammonia during gelation, and reaction temperature. Forty weight percent of amine sol can co-gel with MTES with target density higher than 0.05 g/cc. The higher the target density, the higher the amount of amine sol can be used in the formulation to result in higher amine loadings in the sorbent.

Amine Functionalized Aerogels

In order to ensure suitability of hydrophobic methyltriethoxysilane (MTES) aerogel for $CO_2$ capture application, amine must be graft into the chemical backbone (MTES leads to intrinsically hydrophobic aerogel without additional hydrophobe treatment). The route for producing this type of hybrid silica aerogel is to co-gel MTES silica with an amine functionalized silica source.

The samples listed in Table 1 were prepared by methods illustrated in the examples below. To prepare the gels, first sols were prepared as in A and then cogelled as in B. To prepare the gel a MTES/TEOS sol (Sols 1-4) was mixed with an aminosilane sol (Sols 5-10) to obtain gels which were then aged and supercritically dried. The MTES/TEOS sol number and the aminosilane sol number for each gel are listed in Table 1. Those skilled in the art will be able to prepare the aerogels listed in Table 1 based on the 11 examples described below.

A. Hydrolysis of MTES and Amine Precursors

Hydrolysis time was 18-24 hours in order to ensure full hydrolysis of the amine precursors. MTES and amine precursor were hydrolyzed separately. MTES was hydrolyzed in acidic medium for periods ranging 16 hours to 24 hrs. The aminosilanes were hydrolyzed without using an acid or base catalyst. Water to silica ratios were tuned in the range of 1.5-12 with a fixed solid content of 20%.

B. Co-Gel of Amine and MTES Hydrolyzed Sols

Once hydrolyzed, the two sols are mixed in specific proportions to obtain the desired concentration of functional groups. Alcohol (ethanol) is added to the mixture to fix the target density of the aerogel. In samples with Aspen IDs ending in A, ammonia was added to the final sol for polycondensation. No ammonia was added to samples with Aspen IDs ending in NA. The sol turns to gel after a certain period of time (called gel time). This time depends on many parameters such as Amine/MTES content, $H_2O$/MTES ratio in the co-gel formulation, $NH_4OH$ content and target density. Description and sorption characteristics of samples examples listed in Table 1 are grouped in Table 5, Table 6, and Table 7.

Synthesis of Amine functionalized aerogels (AFA) sorbents involves synthesis of wet gel of amine functionalized MTES/TEOS followed by aging and liquid $CO_2$ extraction. Wet gel of amine functionalized MTES/TEOS can be obtained by co-gel of amine functionalized silane to form a hybrid or by surface treatment of MTES/TEOS gels with amines in the aging stage by impregnation. The amines included but not limited to mono-amine, diamine, triamine, pentaamine, and polyamines. Water and ammonia concentration can be varied in different formulations.

The volume of the sol after hydrolysis varies under different reaction conditions and need to be monitored and measured carefully in order to maintain the targeted density of the gels. The reason is that target density of the co-gel wet gel is defined by the solid content from both MTES/TEOS and APTES sols divided by the volume of the gel. Condensation factor is used to measure the concentrating degree of the sol by defining as the ratio of the volume of the sol after reaction to the starting volume.

Sol 1. Preparation of MTES/TEOS Sol with 4.1 Wt % of TEOS Using oPA Catalyst

To make 1200 ml of MTES/TEOS sol, first mix 0.71 g orthophosphoric acid (oPA) with 279.1 ml water in a 2-Liter round bottomed flask. To this mixture add 876.3 ml MTES and 46.4 ml TEOS while stirring. Then reflux the mixture at 77-78° C. for 20 hours and cool it to room temperature before use. Condensing factor is close to 1.

Sol 2. Preparation of MTES Sol Using oPA Catalyst

To make 1400 ml of MTES sol, first mix 0.82 g ortho-phosphoric acid (oPA) with 326.3 ml water in a 2-Liter round bottomed flask. To this mixture add 1073.1 ml MTES while stirring. Then reflux the mixture at 76-77° C. for 15 hours and cool it to room temperature before use Sol 3. Preparation of MTES/TEOS Sol with 2.0 Wt % of TEOS Using HOAc Catalyst To make 500 ml of MTES/TEOS sol, first mix 0.071 g Acetic acid (HOAc) with 116.3 ml water in a 1-Liter beaker. To this mixture add 374.0 ml MTES and 9.6 ml TEOS while stirring. Then heat the mixture to 60° C. for 18 hours and cool it to room temperature before use. Final volume of the sol is 445 ml after cool to RT due to evaporation of solvent and condensing factor is 0.89. Condensing factor of the sol was ~1.

Sol 4. Preparation of MTES/TEOS Sol with 4.0 Wt % of TEOS Using HOAc Catalyst

To make 500 ml of MTES/TEOS sol, first mix 0.071 g Acetic acid (HOAc) with 116.1 ml water in a 1-Liter beaker. To this mixture add 364.8 ml MTES and 19.0 ml TEOS while stirring. Then heat the mixture to 60° C. for 18 hours and cool it to room temperature before use. Final volume of the sol is 367 ml after cool to RT due to evaporation of solvent and condensing factor is 0.734. Condensing factor of the sol was ~1.

Sol 5. Preparation of APTES Sol with $H_2O/Si=8$

To make 150 ml APTES sol, first mix 37.9 ml water and 54.5 ml ethanol. To this mixture add 57.6 ml APTES and stir for at least 24 hours at room temperature or heating for 6 hours at 60.° C. Keep the container sealed during the reaction. Condensing factor of the sol was ~1 or 0.95 in two different batches.

Sol 6. Preparation of APTES Sol with $H_2O/Si=2.2$

To make 50 ml APTES sol, first mix 3.3 ml water and 28.4 ml ethanol. To this mixture add 18.3 ml APTES and stir for at least 24 hours at room temperature or heating for 6 hours at 60° C. Keep the container sealed during the reaction. Condensing factor of the sol was ~1.

Sol 7. Preparation of APTMS Sol with $H_2O/Si=3$

To make 150 ml APTES sol, add 35.4 ml water to 114.6 ml APTMS in a 1 L-beaker by adding drop wise and stir for 10 minutes at room temperature. This reaction is violent and should be controlled carefully by slow addition of water and also cooling by ice bath if running huge volumes. After the reaction, sol volume is reduced slightly and then added ethanol to the sol to reach 150 ml starting volume. In this case, condensing factor of the sol was ~1.

Sol 8. Preparation of AE-APTMS Sol with $H_2O/Si=8$

To make 230 ml APTES sol, first mix 38.3 ml water and 132.1 ml ethanol. To this mixture add 59.6 ml AE-APTMS and stir for 20 hours at room temperature. Keep the container sealed during the reaction. Condensing factor of the sol was ~1.

Sol 9. Preparation of AE-APTMS Sol with $H_2O/Si=5.5$

To make 230 ml APTES sol, first mix 26.0 ml water and 145.2 ml ethanol. To this mixture add 58.8 ml AE-APTMS and stir for 20 hours at room temperature. Keep the container sealed during the reaction. Condensing factor of the sol was ~1.

Sol 10. Preparation of TMS-DETA Sol

Five (5) g of (3-trimethoxysilylpropyl) diethylenetriamine (TMS-DETA) were dissolved in 12 ml of EtOH. 3 ml of water were added to the mixture and mixed for 16 hrs at room temperature.

The above sols were used to prepare the aerogels investigated as $CO_2$ sorbents according to the following illustrative examples.

Example 1

Preparation of Sorbent CQ (WD-24C, Target Density: 0.065 g/Cc, 40% APTES, Total $H_2O/Si=4.4$)

To make a gel with 40 ml volume, first dilute 6.1 ml MTES/TEOS sol prepared in Sol 1 with 28.2 ml ethanol. To this mixture add 5.7 ml APTES sol prepared in Sol 5 while stirring. After stirring for 1 hour, pour the sol into a mold for gelation. Gel time is within two days.

$CO_2$ sorption capacity for this sorbent at 40° C. and 0.15 $PCO_2$ is 6.74 lb $CO_2$/100 lb sorbent with a fast sorption kinetics of 6.2 minutes to 80% Capacity Equilibrium. Working Capacity of this sample is 4.35 lb $CO_2$/100 lb sorbent. Working Capacity is the capacity of the sorbent to adsorb the CO2 in the next capture cycle. This is typically the difference between adsorption and desorption amount sin the immediately preceding cycle.

$CO_2$ sorption capacity for this sorbent at 55° C. is 7.40 lb $CO_2$/100 lb sorbent with a fast sorption kinetics of 4.2 minutes to 80% Capacity Equilibrium.

Example 2

Preparation of Sorbent CN (WD-25A, Target Density: 0.05 g/Cc, 30% APTES, Total $H_2O/Si=8$)

To make a gel with 40 ml volume, first mix 5.5 ml MTES/TEOS sol prepared in Sol 1 with 31.2 ml ethanol while stirring. To this mixture add 3.3 ml APTES sol prepared in Sol 5 and stir for 1 hour. Then pour the sol into a mold for gelation. Gel time is within 2 days.

$CO_2$ sorption capacity for this sorbent at 55° C. is 7.26 lb $CO_2$/100 lb sorbent with a fast sorption kinetics of 5 minutes to 80% Capacity Equilibrium.

Example 3

Preparation of Sorbent CR (WD-26C, Target Density: 0.065 g/Cc, 40% APTES, Total $H_2O/Si=4.4$)

To make a gel with 40 ml volume, first dilute 6.1 ml MTES sol prepared in Sol 2 with 28.2 ml ethanol. To this mixture add 5.7 ml APTES sol prepared in Sol 5 while stirring. After stirring for 1 hour, pour the sol into a mold for gelation. Gel time is within four days.

$CO_2$ sorption capacity for this sorbent at 55° C. is 5.49 lb $CO_2$/100 lb sorbent with a fast sorption kinetics of 5 minutes to 80% Capacity Equilibrium.

Example 4

Preparation of Sorbent GE (WD-44-15C, Target Density: 0.262 g/Cc, 40% APTES, Total $H_2O/Si=1.6$, 4% TEOS in MTES/TEOS Sol)

To make a gel with 75 ml volume, Mix 33.6 ml MTES/TEOS sol (with condensing factor of 0.734) prepared in Sol 4 with 41.4 ml APTES sol (with condensing factor of 0.95) prepared in Sol 5. After stirring for 10 minutes, pour the sol into a mold for gelation. Gel time is about half an hour.

$CO_2$ sorption capacity for this sorbent at 40° C. and 0.15 $PCO_2$ is 7.37 lb $CO_2$/100 lb sorbent with a fast sorption kinetics of 6.9 minutes to 80% Capacity Equilibrium. Working Capacity of this sample is 5.60 lb $CO_2$/100 lb sorbent.

Example 5

Preparation of Sorbent HI (WD-48A, Target Density: 0.317 g/Cc, 40% APTMS, Total $H_2O/Si=1.86$, 2% TEOS in MTES/TEOS Sol)

To make a gel with 150 ml volume, mix 105.6 ml MTES/TEOS sol (with condensing factor of 0.952) prepared in Sol 3 and 33.9 ml APTMS sol (with condensing factor of 1) prepared in Sol 7. After stirring for 10 seconds, pour the sol into a mold for gelation. Gel time is one minute.

$CO_2$ sorption capacity for this sorbent at 40° C. and 0.15 $PCO_2$ is 10.4 lb $CO_2$/100 lb sorbent with a medium sorption kinetics of 39.1 minutes to 80% Capacity Equilibrium. Working Capacity of this sample is 5.36 lb $CO_2$/100 lb sorbent.

Example 6

Preparation of Sorbent HH (WD-48B, Target Density: 0.331 g/Cc, 50% APTMS, Total $H_2O$/Si=2, 2% TEOS in MTES/TEOS Sol)

To make a gel with 150 ml volume, mix 92.0 ml MTES/TEOS sol (with condensing factor of 0.952) prepared in Sol 3 and 58.0 ml APTMS sol (with condensing factor of 1) prepared in Sol 7. After stirring for 10 seconds, pour the sol into a mold for gelation. Gel time is one minute.

$CO_2$ sorption capacity for this sorbent at 40° C. and 0.15 $PCO_2$ is 9.6 lb $CO_2$/100 lb sorbent with a medium sorption kinetics of 30 minutes to 80% Capacity Equilibrium.

Example 7

Preparation of sorbent HG (WD-48C, target density: 0.347 g/cc, 60% APTMS, total $H_2O$/Si=2, 2% TEOS in MTES/TEOS sol)

To make a gel with 150 ml volume, mix 77.1 ml MTES/TEOS sol (with condensing factor of 0.952) prepared in Sol 3 and 72.9 ml APTMS sol (with condensing factor of 1) prepared in Sol 7. After stirring for 10 seconds, pour the sol into a mold for gelation. Gel time is two minutes.

$CO_2$ sorption capacity for this sorbent at 40° C. and 0.15 $PCO_2$ is 8.4 lb $CO_2$/100 lb sorbent with a slow sorption kinetics of 46.9 minutes to 80% Capacity Equilibrium.

Example 8

Preparation of Sorbent WD-37A2 (Target Density: 0.065 g/Cc, 30% AE-APTMS, Total $H_2O$/Si=8, No $NH_4OH$ Catalyst in Gelation)

To make a gel with 50 ml volume, first mix 8.9 ml MTES/TEOS sol prepared in Sol 1 with 32.2 ml ethanol and 3.4 ml water while stirring. To this mixture add 5.5 ml AE-APTMS sol prepared in Sol 8 and stir for 1 hour. Then pour the sol into a mold for gelation. Gel time is within 5 days.

Example 9

Preparation of Sorbent WD-42C (Target Density: 0.087 g/Cc, 30% AE-APTMS, Total $H_2O$/Si=3.4, No $NH_4OH$ Catalyst in Gelation)

To make a gel with 50 ml volume, first mix 11.9 ml MTES/TEOS sol prepared in Sol 1 with 30.6 ml ethanol. To this mixture add 7.5 ml AE-APTMS sol prepared in Sol 9 and stir for 1 hour. Then pour the sol into a mold for gelation. Gel time is within 2.5 days.

Example 10

Preparation of Sorbent TA35W12NA, Target Density: 0.1 g/Cc, 35% TMS-DETA, Total $H_2O$/Si=12, 4% TEOS in MTES/TEOS Sol The MTES/TEOS (17.64 ml) sol prepared in example 4 was diluted with 16.64 ml ethanol. To this mixture 5 ml of water were added. The sol resulting was stirred for 1 hr. Later, TMS-DETA Sol 10 and diluted MTES/TEOS sol were mixed together for 15 minutes before transfer into mold for gelation. Gelation occurred within 72 hours at room temperature. Gels were relatively weak.

TABLE 1

Preparation of amine functionalized aerogels.

| Sample ID | Aspen ID | TD g/cc | Amine | % Amine | Sol No. | % MTES-TEOS sol | Sol No. |
|---|---|---|---|---|---|---|---|
| CM | A40W12NA | 0.065 | APTES | 40 | 5 | 60 | 1 |
| CN | A35W12NA | 0.120 | APTES | 35 | 5 | 65 | 1 |
| CQ | A40W12NA | 0.100 | APTES | 40 | 5 | 60 | 1 |
| CR | A40W3A | 0.120 | APTES | 40 | 6 | 60 | 2 |
| CZ | A30W12NA | 0.100 | APTES | 30 | 5 | 70 | 4 |
| DF | A40W12A | 0.100 | APTES | 40 | 5 | 60 | 4 |
|  | A25W12NA | 0.087 | APTES | 25 | 5 | 75 | 4 |
|  | A30W12NA | 0.087 | APTES | 30 | 5 | 70 | 4 |
|  | A40W6A | 0.087 | ATPES | 40 | 6 | 60 | 4 |
| CO | DA40W12NA | 0.065 | AE-APTMS | 40 | 8 | 60 | 4 |
| CP | DA35W12NA | 0.120 | AE-APTMS | 35 | 8 | 65 | 4 |
| CW | DA40W12NA | 0.10 | AE-APTMS | 40 | 8 | 60 | 4 |
| CY | DA40W3A | 0.120 | AE-APTMS | 40 | 9 | 60 | 4 |
| DB | DA30W12NA | 0.100 | AE-APTMS | 30 | 8 | 70 | 4 |
| CX | DA40W3A | 0.100 | AE-APTMS | 40 | 9 | 60 | 4 |
| DA | DA40W12A | 0.100 | AE-APTMS | 40 | 8 | 60 | 4 |
| DC | DA40W6A | 0.100 | AE-APTMS | 40 | 9 | 60 | 4 |
| DD | DA40W12A | 0.065 | AE-APTMS | 40 | 8 | 60 | 4 |
| DE | DA35W12A | 0.100 | AE-APTMS | 35 | 8 | 65 | 4 |
| ED | TA40W12NA | 0.065 | AE-APTMS | 40 | 10 | 60 | 4 |
| EE | TA35W12NA | 0.120 | TMS-DETA | 35 | 10 | 65 | 4 |
| EF | TA35W12NA | 0.100 | TMS-DETA | 35 | 10 | 65 | 4 |
| EG | TA40W3A | 0.120 | TMS-DETA | 40 | 10 | 60 | 4 |
| EA | TA30W12NA | 0.100 | TMS-DETA | 30 | 10 | 70 | 4 |
| EB | TA30W12A | 0.100 | TMS-DETA | 30 | 10 | 70 | 4 |
| EC | TA25W12A | 0.100 | TMS-DETA | 25 | 10 | 75 | 4 |
| WD-34C | TA40W6A | 0.087 | TMS-DETA | 40 | 10 | 60 | 4 |

TABLE 1-continued

Preparation of amine functionalized aerogels.

| Sample ID | Aspen ID | TD g/cc | Amine | % Amine | Sol No. | % MTES-TEOS sol | Sol No. |
|---|---|---|---|---|---|---|---|
| HI | WD-48A | 0.317 | APTMS | 40 | 7 | 60 | 3 |
| HH | WD-48B | 0.331 | APTMS | 50 | 7 | 50 | 3 |
| HG | WD-48C | 0.347 | APTMS | 60 | 7 | 40 | 3 |
| HE | B1 untreated | 0.250 | PEI | 50 | — | 40 | 4 |
| GE | WD-44-15C | 0.262 | APTES | 40 | 5 | 60 | 4 |

Example 11

Preparation of Sorbent TA30W12A, Target Density: 0.1 g/Cc, 30% TMS-DETA, Total H2O/Si=12, 4% TEOS in MTES/TEOS Sol MTES/TEOS (20.58 ml) sol prepared in example 4 was diluted with 13.72 ml ethanol. To this mixture 5 ml of ammonia solution (2 N) were added. The sol resulting was stirred for 15 minutes. Noticeable increase in viscosity of the MTES/TOES sol was noticed. TMS-DETA sol (Sol 10) was added to MTES/TEOS sol and mixed together for 30 minutes before transfer into mold for gelation. Gelation occurred within 72 hrs at room temperature.

Physical and Structural Characterization

Some of the amine functionalized aerogels of the current invention (mono-, di-, and tri-amine/MTES aerogels) were analyzed by nitrogen adsorption-desorption technique. The composition of the aerogel samples tested is reported in Table 2.

TABLE 2

Composition of different Amine Functionalize Aerogels tested by liquid nitrogen-Sorption-desorption technique.

| | Sample ID | Density (g/cc) | $H_2O/Si^{(1)}$ | Amine (wt %) | $NH_4OH$ (vol %) |
|---|---|---|---|---|---|
| Mono-AFA | A25W12NA | 0.121 | 12 | 25 | 0 |
| | A30W12NA | 0.131 | 12 | 30 | 0 |
| | A35W12NA | 0.128 | 12 | 35 | 0 |
| | A40W12NA | 0.124 | 12 | 40 | 0 |
| | A40W3A | 0.132 | 3 | 40 | 7 |
| | A40W6A | 0.133 | 6 | 40 | 7 |
| | A40W12A | 0.136 | 12 | 40 | 7 |
| Di-AFA | DA40W6A | 0.136 | 6 | 40 | 7 |
| | DA40W12A | 0.134 | 12 | 40 | 7 |
| Tri-AFA | TA40W6A | 0.142 | 5 | 40 | 7 |
| | TA40W12A | 0.133 | 12 | 40 | 7 |

$^{(1)}$Total amount of water in the co-gel

Figure 3:
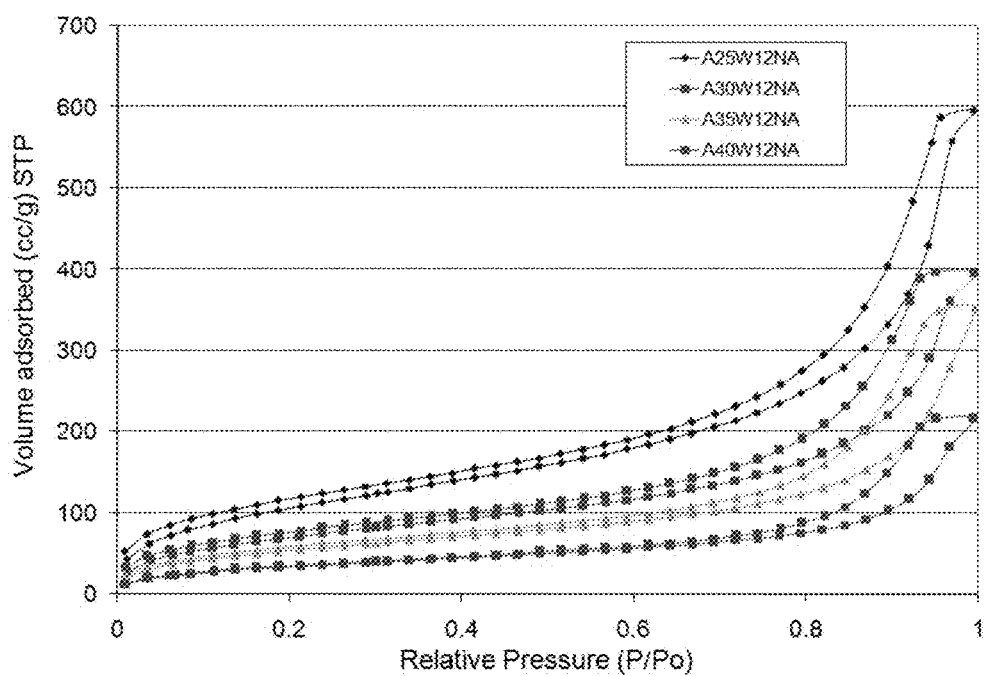
FIG. 3 illustrates nitrogen sorption-desorption isotherms of mono-amine/MTES aerogels (no ammonia added).
Figure 4:
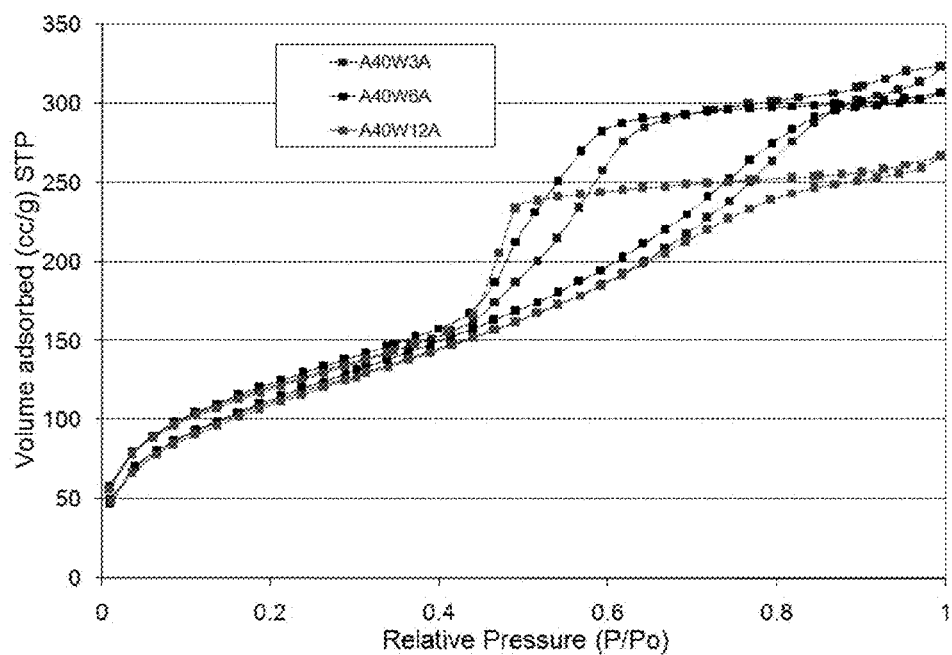
FIG. 4 illustrates nitrogen sorption-desorption isotherms of mono-amine/MTES aerogels (ammonia added).

FIG. 3 shows the $N_2$ adsorption isotherms of the mono-AFA samples un-catalyzed. These aerogels exhibit type IV isotherms consistent with a highly porous solid with an average pore size of around 9-10 nm. The isotherm, as shown in FIG. 3, exhibits a significant hysteresis curve at high partial pressures, a feature that is typically consistent with capillary condensation within mesopores. Analysis of the adsorption isotherm data will afford the surface area, average pore size and cumulative pore volume for these materials. As the amount of amine increases, the surface area and pore volume of the aerogel decrease. As illustrated in FIG. 4, the second set of mono-AFA samples (catalyzed with ammonia) exhibit different isotherms with a volume of liquid nitrogen adsorbed at high partial pressure relatively lower than the previous set of samples. The use of ammonia catalyst during gelation (and the amount of water in the gel) seems to have a big impact on the structure of the aerogel. The high pH of the system make the structure of the aerogel relatively compact with small pore size distribution and low pore volume.

Figure 5:
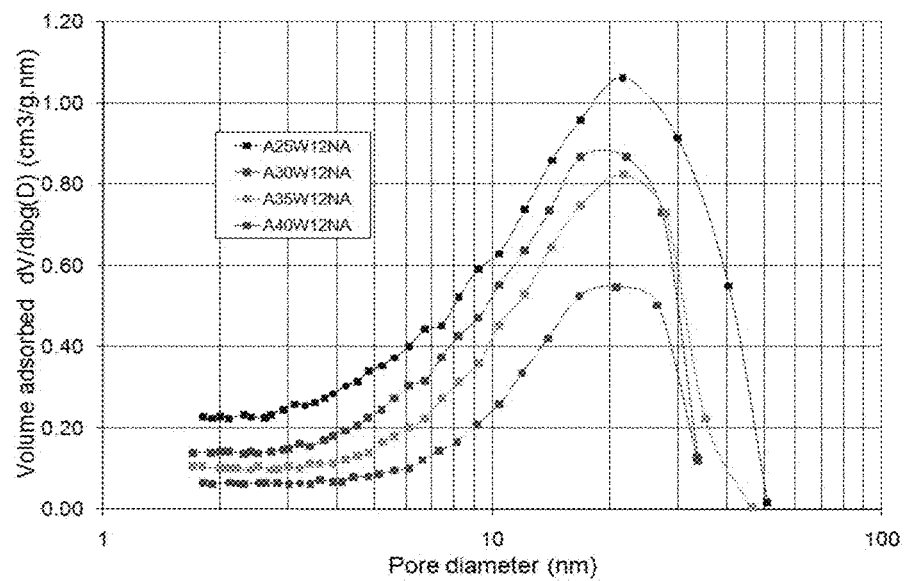
FIG. 5 illustrates pore size distribution of mono-amine/MTES aerogels (no ammonia added).
Figure 6:
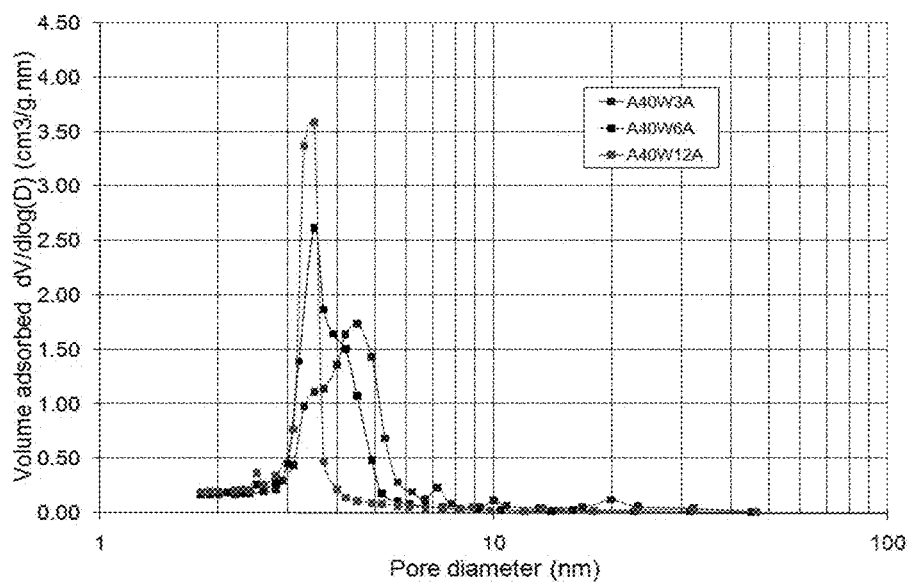
FIG. 6 illustrates pore size distribution of mono-amine/MTES aerogels (no ammonia added).

FIG. 5 and FIG. 6 illustrate the pore size distribution of the two set of samples. The un-catalyzed samples have broader pore size distribution centered on 20 nm. As the amine content increases, the pore volume adsorbed decreases and average pore diameter remains unchanged. The catalyzed samples exhibit more narrowed pore size distribution (3-4 nm) and size of the pores get smaller as base is used as catalyst and water amount increases in the gel. It should also be noted that $N_2$ adsorption is most applicable for mesoporous solids and generally underestimates the specific surface area of aerogels as it inherently neglects any contributions from micro- and macroporosity. The meso-structure properties of the AFA samples are reported in Table 3.

TABLE 3

Composition of different Amine Functionalize Aerogels tested by liquid nitrogen-Sorption-desorption technique.

| | Sample ID | Density (g/cc) | $S_{BET}$ (m$^2$/g) | Cum. Pore volume (cc/g) | ~pore diameter (nm) |
|---|---|---|---|---|---|
| Mono-AFA | A25W12NA | 0.121 | 420 | 0.92 | 10.6 |
| | A30W12NA | 0.131 | 408 | 0.51 | 12.1 |
| | A35W12NA | 0.128 | 400 | 0.52 | 9.2 |
| | A40W12NA | 0.124 | 264 | 0.63 | 9.3 |
| | A40W3A | 0.132 | 405 | 0.41 | 4.1 |
| | A40W6A | 0.133 | 204 | 0.51 | 4.5 |
| | A40W12A | 0.136 | 130 | 0.32 | 5.0 |
| Di-AFA | DA40W6A | 0.136 | 455 | 1.39 | 12.0 |
| | DA40W12A | 0.134 | 323 | 1.25 | 16.0 |
| Tri-AFA | TA40W6A | 0.142 | 164 | 0.95 | 24.0 |
| | TA40W12A | 0.133 | 25 | 0.23 | 39.2 |

Surface Nitrogen by X-Ray Photonelectron Spectroscopy (XPS) Measurements

Two AFA samples (CN and CQ) and one blank aerogel sample (pure MTES aerogel) were analyzed by X-ray Photonelectron Spectroscopy (XPS). The compositions of the three samples are given in Table 4.

TABLE 4

Composition of the aerogel samples subjected to XPS analysis.

| ID sample (by ADA)$^{(1)}$ | ID sample (by Aspen) | Amine loading (wt. %)$^{(2)}$ | Water/Si ratio | Density (g/cc) |
|---|---|---|---|---|
| CN | A35W12NA | 35 | 12 | 0.142 |
| CQ | A40W12NA | 40 | 12 | 0.132 |
| — | MTES | 0 | 8 | 0.112 |

$^{(1)}$CN and CQ AFA samples were tested by ADA for CO2 capacity and energy regeneration.
$^{(2)}$Amine loading corresponds to the amount by weight of APTES commixed with MTES.

Figure 7:
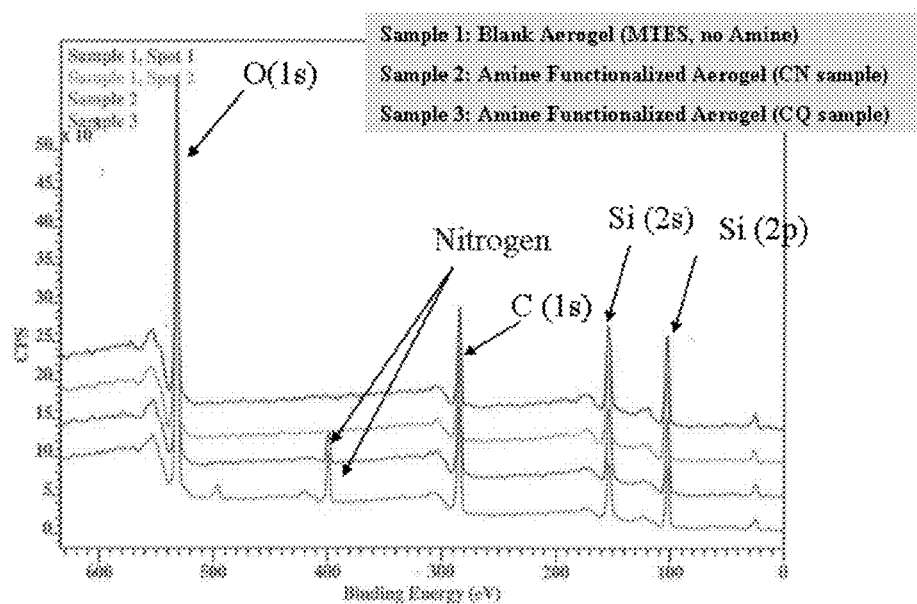
FIG. 7 illustrates an XPS spectra of MTES aerogel (blank sample) and two amine functionalized aerogels.

The analysis was performed at Answer Analytical Inc. and carried out with a PHI 5600ci instrument using monochromatic Al $K_\alpha$, X-rays. The spectra of the three samples are shown in FIG. 7. Presence of amine on the surface of the two AFA samples confirms the functionalization of backbone of MTES aerogel. The % nitrogen (N1s Peak) and other elements (Oxygen, O (1s), Silicon Si (2s, 2p), Carbon (1s)) were calculated by measuring peak areas in the high-resolution spectra and then converting to atomic concentrations using instrument manufacturer provided sensitivity factors. The concentration of nitrogen in CQ sample is around 9.7%, higher than CN sample by 44% (5.4% N in CN sample).

Testing the Sorbent

Figure 8:
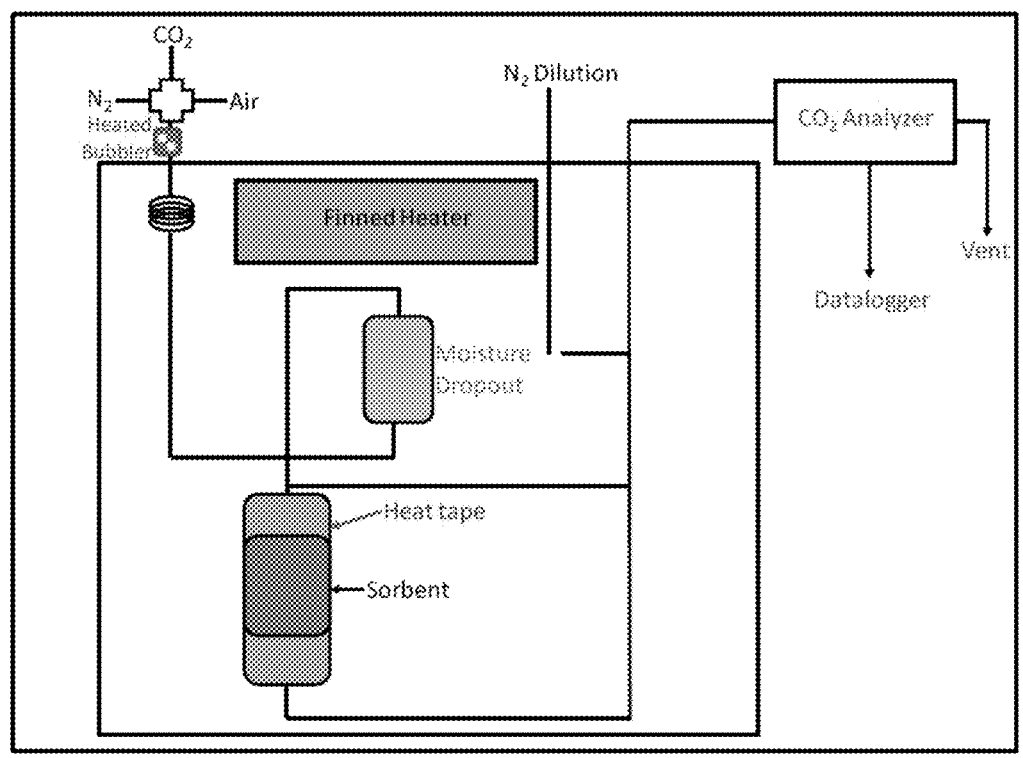
FIG. 8 illustrates a schematic of CO2 sorbent test unit.

All testing was carried out using a specialized fixed bed reactor. This unit was designed to be used in the laboratory on simulated flue gas as well as in the field on actual flue gas with minimal modifications. A Programmable Logic Controller was employed to completely automate the process. With an automated system, a series of sorption/regeneration cycles can be completed with little to no supervision. The flow rate of either simulated or actual flue gas was approximately 300 sccm, and the amount of sorbent in the reactor was usually in the range of 0.5 to 2.5 g, depending on each material's particle size. The sorbent and flue gas are contacted in a fixed bed through a sequence of temperature controlled lines and electrically controlled valves. FIG. 8 shows a schematic of the sorbent screening testing unit when setup for laboratory testing (only minor modifications are necessary for field testing). The $CO_2$ analyzer was a continuous NDIR sensor with a 90% response time of 10 seconds. This response time should be taken into consideration when examining results. It is probable that the response time of the instrument affects results for materials tested in 0.5 g quantities more extensively than those tested in 2.5 g quantities.

After the sorbent was placed into the fixed bed it was heated to an initial flushing temperature. The initial flushing temperature based on the lowest regeneration temperature. A thermocouple on the outside of the glass fixed bed was used to determine when the bed had reaches the desired temperature. When the bed temperature matches the desired sorption temperature, the sorbent was flushed with dry $N_2$ for 10 minutes or until no $CO_2$ was measured in the purge gas stream, whichever was longer. Then the simulated flue gas, an admixture of compressed gases, was sent through the bypass line circumventing the sorbent. The composition of the laboratory sample gas, by volume, was approximately 12% $CO_2$, 4% $O_2$, with a balance of $N_2$. The relative humidity (RH) was controlled using a heated bubbler. The most common RH set points are 0% or 50% (0 or ~7% by volume, respectively). Note that the 7% moisture by volume corresponds to a dew point (i.e. bubbler temperature setting) of 40° C. When the $CO_2$ reading stabilized at the known $CO_2$ concentration (i.e., baseline reading), the gas flow was directed through the sorbent. After the $CO_2$ levels returned to their original levels (i.e., the sorbent was saturated with $CO_2$), the gas was sent through the bypass, which was the end of the sorption step.

A temperature swing with a $N_2$ purge gas was used to regenerate the sorbents and desorb the $CO_2$. The regeneration purge gas flow rate was the same as that of the flue gas, approximately 300 sccm. To begin the regeneration step, the system stopped flue gas flow and began heated N2 flow. While the heated purge gas was flowing through the sorbent the heat tape on the outside of the fixed bed was used to ensure that the sorbent was fully heated to the selected regeneration temperature. Upstream of the reactor the $N_2$ purge gas was directed through a bubbler separate from the one used for sorption. This bubbler was primarily used at room temperature to add less than 2% by volume moisture to the regeneration gas.

Sorbent Testing Conditions

Three batches of different AFA samples were sent to ADA for $CO_2$ sorption capacity screening. The laboratory testing conditions of the three batches are provided in the Table 5, Table 6, and Table 7.

TABLE 5

Sorbent screening conditions (mono-AFA)

| | Sorbent (ADA# ID) | | | | | | |
|---|---|---|---|---|---|---|---|
| | ED | EE | EF | EG | EA | EB | EC |
| Sorbent (Aspen #ID) | TA40W12NA | TA35W12NA | TA40W12NA | TA40W3A | TA30W12NA | TA30W12A | TA25W12A |
| Density (g/cc) | 0.082 | 0.142 | 0.132 | 0.142 | 0.131 | 0.135 | 0.133 |
| Test type | Parametric | Parametric | Parametric | Parametric | Parametric | Parametric | Parametric |
| Cycle completed | 38 | 34 | 37 | 26 | 30 | 26 | 29 |
| Sample size (g) | 1.08 | 1.01 | 0.49 | 1.03 | 1.01 | 1.03 | 0.99 |
| Sorption conditions | | | | | | | |
| $CO_2$ Conc. (%) | 12 | 12 | 12 | 12 | 12 | 12 | 12 |
| $O_2$ Conc. (%) | 4 | 4 | 4 | 4 | 4 | 4 | 4 |
| Moisture level (%) | 40 | 40 | 40 | 40 | 40 | 40 | 40 |
| Temperature (C.) | 55 | 55 | 55 | 55 | 55 | 55 | 55 |
| Time (sec.) | 250 | 250 | 250 | 250 | 250 | 250 | 250 |
| Regeneration conditions | | | | | | | |
| Temperature (C.) (cycles) | 80 (1-9) 100 (10-19) 120 (20-39) | 80 (1-9) 100 (10-19) 120 (20-35) | 80 (1-9) 100 (10-19) 120 (20-38) | 80 (1-9) 100 (10-19) 120 (20-27) | 80 (1-9) 100 (10-19) 120 (20-31) | 80 (1-9) 100 (10-19) 120 (20-27) | 80 (1-9) 100 (10-19) 120 (20-30) |
| Time (sec.) | 750 | 800 | 800 | 800 | 900 | 900 | 950 |

TABLE 6

Sorbent screening conditions (di-AFA)

| | Sorbent (ADA# ID) | | | | |
|---|---|---|---|---|---|
| | CO | CP | CW | CY | DB |
| Sorbent (Aspen #ID) | DA40W12NA | DA35W12NA | DA40W12NA | DA40W3A | DA30W12NA |
| Density (g/cc) | 0.082 | 0.142 | 0.134 | 0.142 | 0.135 |
| Test type | Parametric | Parametric | Parametric | Parametric | Parametric |
| Cycle completed | 34 | 110 | 39 | 33 | 42 |
| Sample size (g) | 0.5 | 0.54 | 0.53 | 1.07 | 1.09 |
| Sorption conditions | | | | | |
| $CO_2$ Conc. (%) | 12 | 12 | 12 | 12 | 12 |
| $O_2$ Conc. (%) | 4 | 4 | 4 | 4 | 4 |
| Moisture level (%) | 50 | 50 | 50 | 50 | 50 |
| Temperature (C.) | 55 | 55 | 55 | 55 | 55 |
| Time (sec.) | 300 | 300 | 300 | 300 | 250 |
| Regeneration conditions | | | | | |
| Temperature (C.) (cycles) | 80 (1-9) 100 (10-19) 120 (20-35) | 80 (1-19) 100 (20-40) 120 (41-125) | 80 (1-9) 100 (10-19) 120 (20-41) | 80 (1-9) 100 (10-19) 120 (20-34) | 80 (1-9) 100 (10-19) 120 (20-43) |
| Time (sec.) | 850 | 650 | 700 | 800 | 1800 |

| | Sorbent (ADA# ID) | | | | |
|---|---|---|---|---|---|
| | CX | DA | DC | DD | DE |
| Sorbent (Aspen #ID) | DA40W3A | DA40W12A | DA40W6A | DA40W12A | DA35W12A |
| Density (g/cc) | 0.133 | 0.136 | 0.135 | 0.096 | 0.132 |
| Test type | Parametric | Parametric | Parametric | Parametric | Parametric |
| Cycle completed | 90 | 30 | 32 | 32 | 39 |
| Sample size (g) | 1.16 | 1.02 | 1.02 | 1 | 1 |
| Sorption conditions | | | | | |
| $CO_2$ Conc. (%) | 12 | 12 | 12 | 12 | 12 |
| $O_2$ Conc. (%) | 4 | 4 | 4 | 4 | 4 |
| Moisture level (%) | 50 | 50 | 50 | 50 | 50 |
| Temperature (C.) | 55 | 55 | 55 | 55 | 55 |
| Time (sec.) | 300 | 400 | 250 | 300 | 250 |
| Regeneration conditions | | | | | |
| Temperature (C.) (cycles) | 80 (1-17) 100 (18-21) 120 (22-91) | 80 (1-9) 100 (10-19) 120 (20-31) | 80 (1-9) 100 (10-19) 120 (20-32) | 80 (1-9) 100 (10-19) 120 (20-33) | 80 (1-9) 100 (10-19) 120 (20-40) |
| Time (sec.) | 700 | 950 | 700 | 800 | 800 |

TABLE 7

Sorbent screening conditions (tri-AFA)

| | Sorbent (ADA# ID) | | | | | |
|---|---|---|---|---|---|---|
| | CM | CN | CQ | CR | CZ | DF |
| Sorbent (Aspen #ID) | A40W12NA | A35W12NA | A40W12NA | A40W3A | A30W12NA | A40W12A |
| Density (g/cc) | 0.082 | 0.142 | 0.132 | 0.142 | 0.135 | 0.135 |
| Test type | Parametric | Parametric | Parametric | Parametric | Parametric | Parametric |
| Cycle completed | 41 | 41 | 36 | 34 | 57 | 23 |
| Sample size (g) | 0.51 | 0.48 | 0.51 | 0.53 | 1.1 | 1 |
| Sorption conditions | | | | | | |
| $CO_2$ Conc. (%) | 12 | 12 | 12 | 12 | 12 | 12 |
| $O_2$ Conc. (%) | 4 | 4 | 4 | 4 | 4 | 4 |
| Moisture level (%) | 50 | 50 | 50 | 50 | 50 | 50 |
| Temperature (C.) | 55 | 55 | 55 | 55 | 55 | 55 |
| Time (sec.) | 400 | 300 | 250 | 300 | 400 | 300 |
| Regeneration conditions | | | | | | |
| Temperature (C.) (cycles) | 80 (1-9) 100 (10-19) 120 (20-42) | 80 (1-9) 100 (10-19) 120 (20-42) | 80 (1-9) 100 (10-19) 120 (20-37) | 80 (1-9) 100 (10-19) 120 (20-35) | 80 (1-9) 100 (10-19) 120 (20-58) | 80 (1-9) 100 (10-19) 120 (20-24) |
| Time (sec.) | 550 | 600 | 600 | 800 | 1800 | 1500 |

Sorbent Testing Results

Based on the laboratory test results, the $CO_2$ capacity and the energy for sorption were estimated. Regeneration energy was calculated by estimating specific heat of the sorbents around 1.3 kJ/kg-K, an enthalpy of reaction of −60 kJ/mol $CO_2$, and a regeneration temperature of 100° C. Overall, the AFA sorbents showed a high $CO_2$ capacity and excellent $CO_2$ sorption/desorption cycling stability, with sample CQ showing the highest $CO_2$ capacity and lowest regeneration energy. The sections below describe these results in more detail.

$CO_2$ Capacity and Energy of Regeneration Measurement

Mono-Amine Functionalized Aerogels

Based on the laboratory test results, the theoretical regeneration energy for sorbents tested was estimated to be less than 1500 kJ/kg $CO_2$. The calculation of the regeneration energy was made by estimating specific heat of the sorbents around 1.3 kJ/kg, an enthalpy of reaction of CO2-sorbent reaction of −60 kJ/mol $CO_2$, and a regeneration temperature of 100° C. Based on these results, CQ (A40W12NA) seems to possess the highest $CO_2$ capacity and lowest regeneration energy. CM, CN, and CQ materials exhibit a high $CO_2$ capacity cycling stability, and they are considered for further testing. These samples contain 35-40% wt amine and differ by their density. Catalyzed samples CR and DF (A40W3A and A40W12A) demonstrate low and relatively unstable $CO_2$ capacity over cycling. The hypothesis given previously saying that un-catalyzed samples with their open and broader pore size distribution facilitate the access of $CO_2$ to the amine sites (which results in high $CO_2$ capacity), was proven to be correct if we compare the results for the samples DF and DR (un-catalyzed) with the others. Overall, the mono-amine (APTES) functionalized aerogels (un-catalyzed) show a high $CO_2$ capacity and excellent $CO_2$ sorption/desorption cycling stability.

Di-Amine Functionalized Aerogels

Di-amine (AE-APTES) functionalized aerogels were tested, at the same conditions as the mono-amine samples. Sample CW (DA40W12NA), un-catalyzed and contains 40 wt % amine, seems to be the best sorbent among the others in terms of capacity and stability of $CO_2$ capture (~6.59%). From this batch of samples, we can make the following remarks:

Un-catalyzed samples (CO, CP, CW, and DB): The $CO_2$ capacity strongly depends on density and amine content. Un-catalyzed di-AFA material with 40% amine loading and a density of 0.13 g/cc (CW: DA40W12NA) is considered a potential candidate for $CO_2$ capture with $CO_2$ capacity around 6.59 wt %. Note that the water content for this specific sample is 12 ($H_2O/SiO_2$ ratio).

Effect of water content (CX, DA, DC): with same amine loading (40%) and same final density, these di-AFA samples showed different $CO_2$ capacity. Low water content ($H_2O/SiO_2$=3 for sample CX, DA40W3A) leads to poor $CO_2$ capacity. As water content increases, $CO_2$ capacity also increases since higher water contents lead to complete hydrolysis and co-polycondensation of MTES and di-amine precursor (AE-APTES). $H_2O/SiO_2$ ratio of 12 showed to be the optimum for max. $CO_2$ capacity outcome.

Effect of density: Low density di-AFA materials (CO, DD) demonstrated low $CO_2$ capacity compared to the ~0.13 g/cc samples. This can be explained by low amine content overall in the material (although they contain 40 wt % amine).

Tri-Amine Functionalized Aerogels

The batch of tri-amine (TMS-DETA) Functionalized Aerogels was tested relatively at the same conditions as the two previous batches (except the humidity which was fixed at 40% instead 50%). The performance of the samples was lower than expected. They exhibit very low $CO_2$ capacity (not exceeding 2 wt %). The effect of amine content, density and water content in the sol-gel preparation don't seem to have big impact on the $CO_2$ capture performance. This specific tri-amine precursor will not be considered for further development and optimization since the aerogel structure does not seem to be retained when using this amine.

Figure 9:
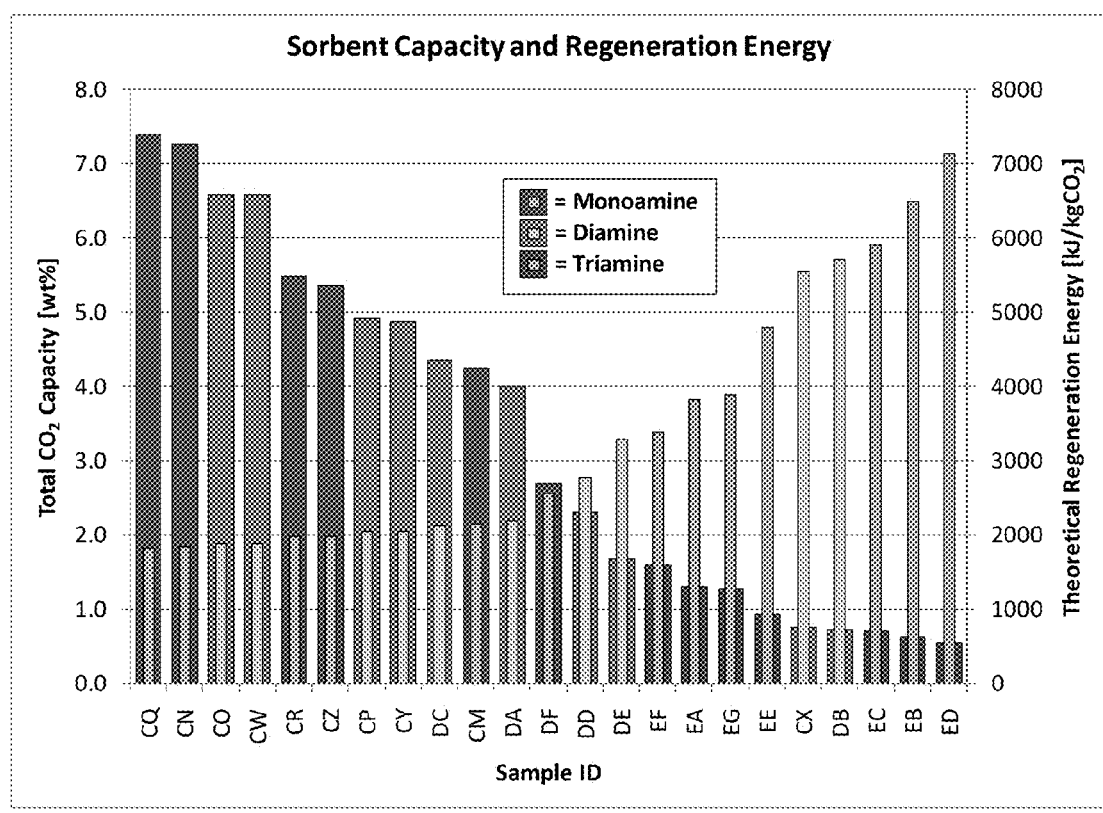
FIG. 9 illustrates the performance of some amine functionalized aerogels of the current invention

FIG. 9 summarizes the performance of all AFA sorbents. It's clear that the mono-AFA materials demonstrated the optimum performance in terms of high $CO_2$ capacity and lower energy of regeneration. The energy of regeneration is inversely proportional to the working $CO_2$ capacity of the sorbent. The higher the working capacity, the lower the energy for regeneration, since there is less non-active mass going through the desorption cycles. Some of diamine and triamine functionalized aerogels are also good $CO_2$ capacity sorption while some others did not.

Thermal Gravimetric Analysis (TGA) Under $CO_2$

Figure 10:
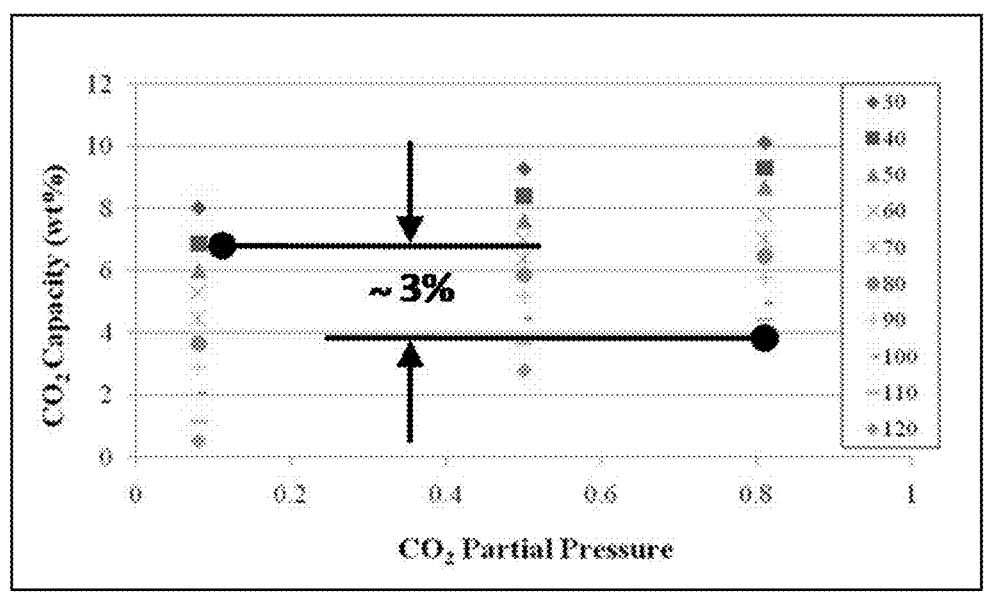
FIG. 10 illustrates the working capacity of one of the samples.

The sample CQ was tested by TGA under $CO_2$ gas to evaluate working $CO_2$ capacity of the material. The sample was heated at different temperatures and $CO_2$ partial pressure. The working $CO_2$ capacity, which a very important property to assess the performance of sorbent, is the difference between the $CO_2$ capacity at temp. of sorption and temp. of regeneration. Typically, a sorbent with working capacity of 5% or greater is considered as promising sorbent for further tests. Sample CQ's performance, as shown in FIG. 10, looks very promising at partial pressure of $CO_2$ of 0.8. The working capacity approached 3%.

Figure 11:
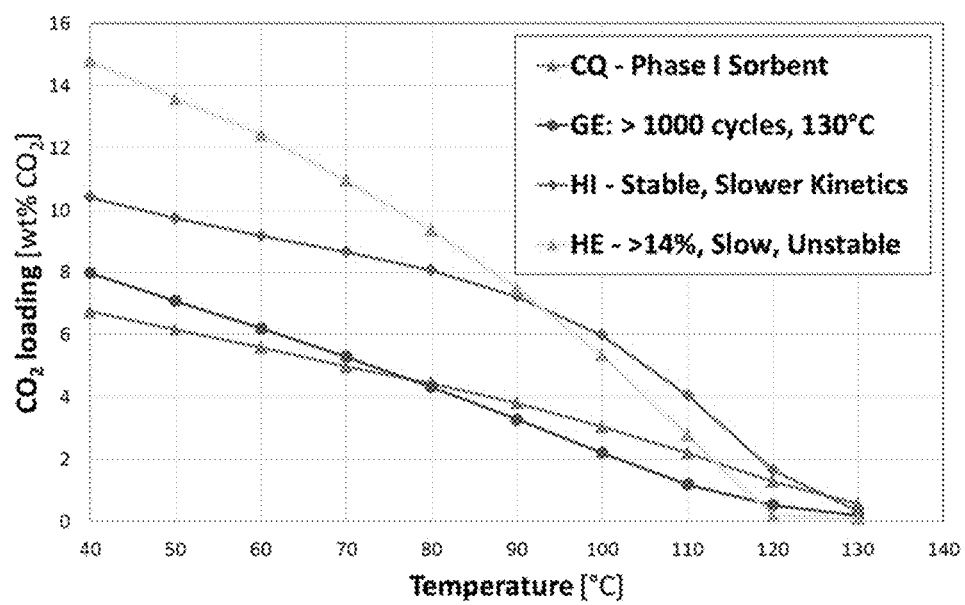
FIG. 11 illustrates the $CO_2$ adsorption capacity at $P_{CO2}=0.15$ versus temperature.
Figure 12:
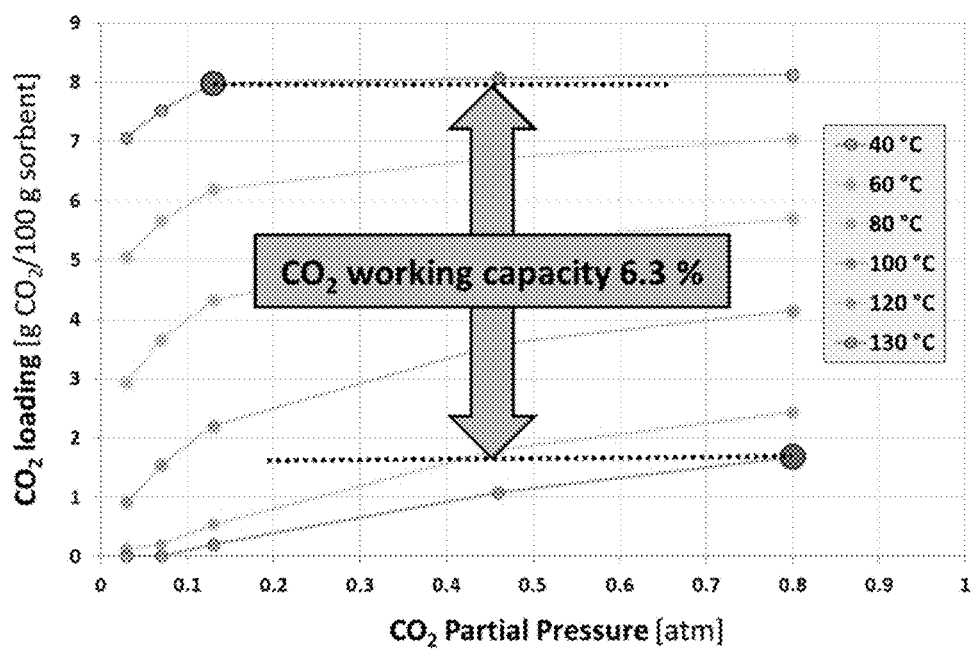
FIG. 12 illustrates the working capacity of another of the samples.
Figure 13:
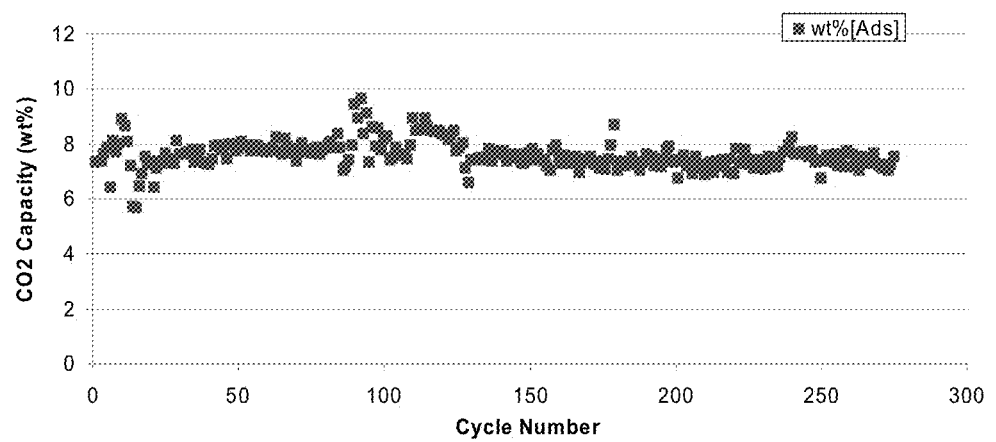
FIG. 13 illustrates $CO_2$ sorption/desorption capacity over 275 cycles of a sample.
Figure 14:
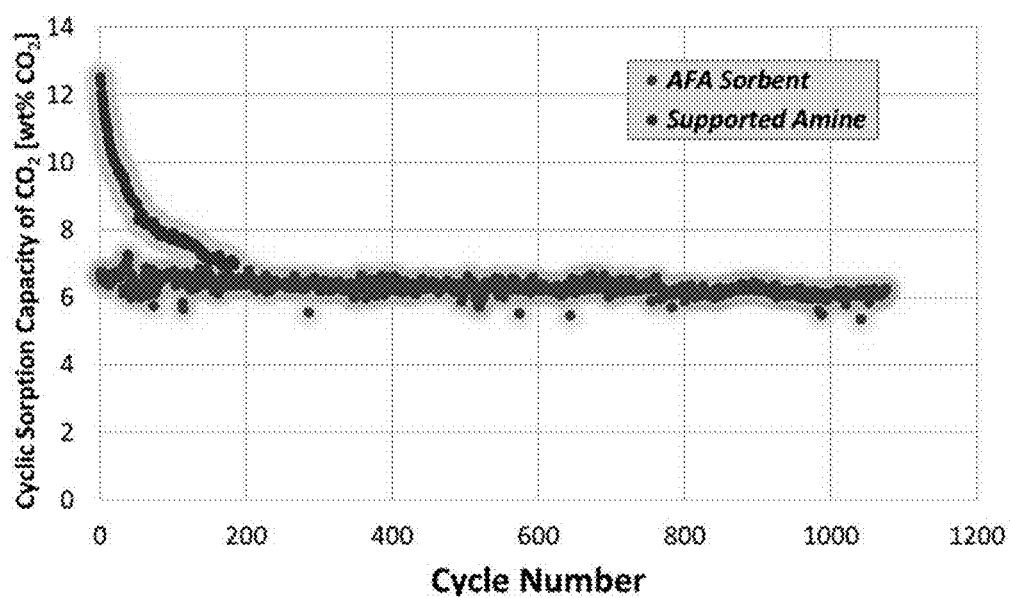
FIG. 14 illustrates a comparison of cyclic stability of an AFA sorbent and a typical amine supported sorbent.

New materials have been prepared and tested and sample GE has been tested for >1000 cycles and it $CO_2$ sorption capacity is higher than CQ as shown in FIG. 11. The working capacity of sample GE is also superior and is shown in FIG. 12 and is 6.3% which is very good compared to other amine supported sorbents.

Long-Term $CO_2$ Capture Sorption/Desorption of CQ Material.

The AFA sorbents are one of the most robust families of sorbents evaluated and have been cycled more than 275 times in the sorption/desorption test facility with little to no loss in $CO_2$ capacity. In Figure, the sorption profile from cycles 1 through 275 for sample CQ essentially is unchanged. Plus, this AFA material has shown high thermal stability and high thermal oxidation resistance. After test was completed, it was noticed that the aerogel sample (AFA, CQ material) was not discolored (typical of stable sorbents). Unstable sorbents, which most of them are, turn yellow due to oxidation after long term testing. This characteristic of the aerogel sorbents adds to the value of the AFA material and makes them very competitive sorbents for $CO_2$ capture.

The New AFA Sorbents are being Evaluated and have been Cycled More than 1000 Times in the Sorption/Desorption Test Facility with Little to No Loss in $CO_2$ Capacity.

In Figure, the sorption profile from cycles 1 through 1100 for sample GE essentially is unchanged. Plus, this AFA material has shown high thermal stability and high thermal oxidation resistance.

TABLE 8

Capacity and regeneration energy of all AFA samples.

| Sorbent [ID] | NH₃ catalyst | Weight [grams] | CO₂ Capacity [wt %] | Amine Type [MONO, DI, TRI] | TRE (Regeneration energy) [kJ/kgk] Low: Cp = 0.7 | TRE (Regeneration energy) [kJ/kgk] High: Cp = 1.3 |
|---|---|---|---|---|---|---|
| CQ | No | 0.51 | 7.4 | MONO | 1827 | 2192 |
| CN | No | 0.48 | 7.3 | MONO | 1836 | 2207 |
| CO | No | 0.50 | 6.6 | DI | 1880 | 2289 |
| CW | No | 0.53 | 6.6 | DI | 1880 | 2289 |
| CR | Yes | 0.53 | 5.5 | MONO | 1975 | 2467 |
| CZ | Yes | 1.10 | 5.4 | MONO | 1989 | 2493 |
| CP | No | 0.54 | 4.9 | DI | 2042 | 2591 |
| CY | Yes | 1.07 | 4.9 | DI | 2049 | 2603 |
| DC | Yes | 1.02 | 4.4 | DI | 2124 | 2743 |
| CM | No | 0.41 | 4.2 | MONO | 2145 | 2781 |
| DA | Yes | 1.02 | 4.0 | DI | 2187 | 2861 |
| DF | Yes | 1.00 | 2.7 | MONO | 2568 | 3568 |
| DD | Yes | 1.00 | 2.3 | DI | 2771 | 3945 |
| DE | Yes | 1.00 | 1.7 | DI | 3288 | 4905 |
| EF | No | 0.49 | 1.6 | TRI | 3383 | 5081 |
| EA | No | 1.01 | 1.3 | TRI | 3825 | 5902 |
| EG | Yes | 1.03 | 1.3 | TRI | 3882 | 6008 |
| EE | No | 1.01 | 0.9 | TRI | 4789 | 7692 |
| CX | Yes | 1.16 | 0.8 | DI | 5546 | 9099 |
| DB | Yes | 1.09 | 0.7 | DI | 5717 | 9415 |
| EC | Yes | 0.99 | 0.7 | TRI | 5902 | 9759 |
| EB | Yes | 1.03 | 0.6 | TRI | 6482 | 10837 |
| ED | No | 1.08 | 0.6 | TRI | 7129 | 12038 |

The invention claimed is:

1. A process of preparing a carbon dioxide capture sorbent comprising the steps of hydrolyzing at least an alkylalkoxysilane, reacting the hydrolyzed alkylalkoxysilane with at least a hydrolyzed aminosilane to form a gel and drying the resulting gel to obtain an aerogel, wherein the aerogel comprises at least an open pore accessible to carbon dioxide.

2. The process of claim 1 wherein at least an amino group is accessible to carbon dioxide.

3. The process of claim 1 wherein the aerogel is hydrophobic.

4. The process of claim 1 further comprising the step of reacting a hydrolyzed tetra-alkoxysilane with at least one of the hydrolyzed silanes.

5. The process of claim 1 further comprising the step of reacting a dialkyldialkoxysilane with at least one of the hydrolysed silanes.

6. The process of claim 1 wherein the alkyl group contains between 1 and 6 carbon atoms.

7. The process of claim 1 wherein any of the silanes have additional functional groups.

8. The process of claim 1 wherein the alkylalkoxysilane contains a mono, di or tri alkyl groups and selected from the group consisting of methyltrimethoxysilane, methyltriethoxysilane, ethyltrimethoxysilane, ethyltriethoxysilane, propyltrimethoxysilane, propyltriethoxysilane, dimethyldimethoxysilane, dimethyldiethoxysilane, diethyldiethoxysilane, diethyldimethoxysilane, trimethylmethoxysilane, trimethylethoxysilane, triethylmethoxysilane, triethylethoxysilane, tripropylmethoxysilane, tripropylethoxysilane, (3,3,3-Trifluoropropyl)trimethoxysilane, (3,3,3-Trifluoropropyl)triethoxysilane and a combination thereof.

9. The process of claim 1 wherein the aminosilane comprises mono, di, tri or poly amine groups.

10. The process of claim 1 wherein the aminosilane is selected from the group consisting of 3-aminopropylmethyldiethoxysilane, 3-aminopropyl-triethoxysilane (APTES), 3-aminopropyl-trimethoxysilane (APTMS), N-(2-aminoethyl)-3-aminopropyltriethoxysilane (AE-APTES), N-(2-aminoethyl)-3-aminopropyl-trimethoxysilane (AE-APTMS), p-aminophenyltrimethoxysilane, N-3-([amino(poly-propyleneoxy])-amino-propyl-trimethoxy-silane (aminoether), (3-trimethoxylsilylpropyl)-diethylenetriamine (TMS-DETA), trimethoxy-silane modified polyethyleneimine and a combination thereof.

11. The process of claim 1 wherein at least an aminogroup is located on or adjacent to the pore surfaces.

12. The process of claim 1 further comprising the steps of contacting the sorbent with a gaseous stream comprising at least some carbon dioxide and capturing at least some of the carbon dioxide in the sorbent.

13. The process of claim 12 further comprising a step of regenerating the sorbent.

14. The process of any of claim 13 wherein the sorbent is stable for at least 250 or at least 500 or at least 1000 or at least 2000 capture-regeneration cycles.

15. The process of claim 1 wherein the aminosilanes from 5% to 70% by weight of the total reactants.

16. The process of claim 4 wherein the percentage of tetraalkoxysilane in the total silanes is between 5 and 90%.

17. The process of claim 1 wherein the density of the aerogel is between 0.01 and 0.6 g/cc and preferably between 0.03 and 0.34 g/cc.

18. The process of claim 12 wherein the carbon dioxide capture rate is between 0.08 gram and 0.5 gram of carbon dioxide per gram of the aerogel in the sorbent.

19. The process of claim 12 wherein any degradation in capture rate is no more than 80% after exposing to temperatures up to 130° C. and capture-regeneration cycles up to 500.

20. A process of preparing a carbon dioxide capture sorbent comprising the steps of hydrolyzing and condensing at least an alkylalkoxysilane, forming a gel, reacting the gel with at least an amine or amine containing compound, drying the resulting gel to obtain an aerogel, wherein the aerogel comprises at least an open pore accessible to carbon dioxide.

21. A process of preparing a carbon dioxide sorbent comprising surface-treating a wet gel or an aerogel prepared from an alkylalkoxysilane with an amine.

22. The process of claim 20 where the amine is selected from tetraethylenepentamine (TEPA), polyethyleneimine (PEI) or combinations thereof.

* * * * *